US012615309B2

(12) United States Patent
    Thyamagundalu et al.

(10) Patent No.: US 12,615,309 B2
(45) Date of Patent: Apr. 28, 2026

(54) SYSTEMS AND METHODS FOR SYNCHRONIZING DIFFERENT KINDS OF OBJECTS WITH AUTHORITATIVE OBJECTS

(71) Applicant: Pensando Systems, Inc., Santa Clara, CA (US)

(72) Inventors: Sanjay Thyamagundalu, San Jose, CA (US); Sudhindra Aithal, San Jose, CA (US)

(73) Assignee: Pensando Systems, Inc., Santa Clara, CA (US)

( * ) Notice: Subject to any disclaimer, the term of this patent is extended or adjusted under 35 U.S.C. 154(b) by 173 days.

(21) Appl. No.: 18/391,491

(22) Filed: Dec. 20, 2023

(65) Prior Publication Data

US 2025/0211639 A1      Jun. 26, 2025

(51) Int. Cl.
    *H04L 67/1095*      (2022.01)
    *H04L 9/40*      (2022.01)
(52) U.S. Cl.
    CPC ...... *H04L 67/1095* (2013.01); *H04L 63/0263* (2013.01)
(58) Field of Classification Search
    None
    See application file for complete search history.

(56) References Cited

U.S. PATENT DOCUMENTS 10,516,669 B2 * 12/2019 Bourgeois ............. G06F 16/178
    2016/0246995 A1 * 8/2016 Dictos ................. H04L 67/1095

2018/0336220 A1 * 11/2018 Hrebicek ............ H04L 67/1095
    2020/0201918 A1 *  6/2020 Karande .............. G06F 16/957
    2021/0392132 A1 * 12/2021 Olden ................. H04L 67/1095

OTHER PUBLICATIONS

Ngo et al., "Using Shibboleth for Authorization and Authentication to the Subversion Version Control Repository System", Jun. 4, 2007, IEEE, Fourth International Conference on Information Technology (ITNG'07) (2007, pp. 760-765) (Year: 2007).*
P416 Language Specification, version 1.2.2, The P4 Language Consortium. May 17, 2021, 170 pgs.
Postel, J. "User Datagram Protocol", RFC 768, Aug. 28, 1980, 3 pgs.
Information Sciences Institute, University of Southern California, "Internet Protocol", Darpa Internet Program Protocol Specification, RFC: 791, Sep. 1981, 51 pgs.
Postel, J. "Internet Control Message Protocol; Darpa Internet Program Protocol Specification", RFC 792, Sep. 1981, 21 pgs.
Information Sciences Institute, University of Southern California, "Transmission Control Protocol", Darpa Internet Program Protocol Specification, RFC: 793, Sep. 1981, 91 pgs.
Eddy, W., Ed, "Transmission Control Protocol (TCP)", RFC: 9293, Aug. 2022, 98 pgs.

* cited by examiner

*Primary Examiner* — Davoud A Zand

(57) ABSTRACT

A processor and a memory communicatively coupled to the processor can be configured to synchronize objects stored with authoritative objects stored by an authoritative server. The memory can store the objects. Synchronizing the plurality of objects can include sharing metadata corresponding to the plurality of objects with the authoritative server, determining which of the objects stored in memory to update in response to sharing the metadata with the authoritative server, and updating at least one of the objects stored in the memory in response to determining that the at least one object may need to be updated.

20 Claims, 18 Drawing Sheets

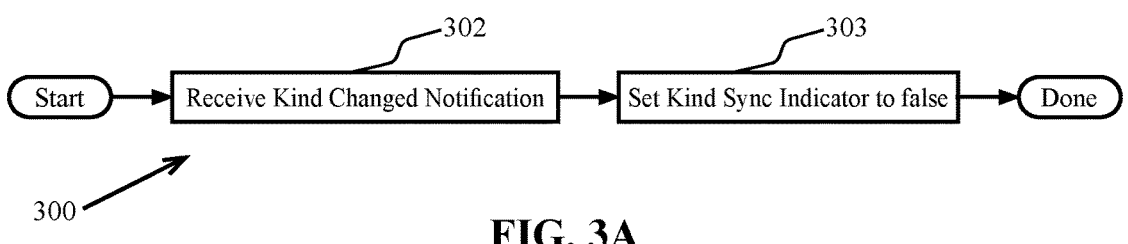

302

Start → Receive Kind Changed Notification → 303 Set Kind Sync Indicator to false → Done

Start

Wait for requests from networking device

Receive kind sync request — 311

Kind sync indicators exist? — 312

No → Initialize kind sync indicators for networking device — 313

Yes

Send kind sync indicators to networking device — 314

Receive kind summary request — 321

Kind summary is current? — 322

Yes → Send kind summary to networking device — 324

No → Create or update kind summary — 323

331 — Receive authoritative object request

332 — Send authoritative object to networking device in authoritative object response Receive object sync confirmation — 333

Set object sync status indicator — 334

Kind is now Synced? — 335

No

Yes → Set kind Sync indicator to true — 326

Software System    601

Software Application    602

Software Components
(e.g., Networking, User Applications,
Servers, UIs, Authoritative Objects,
Kind Synchronization Indicators, Object
Synchronization Indicators, Kind Summary
Generator, Authoritative Kind Updater,
Authoritative Object Request Handler)
625

Shell
or
Interface
615

Operating System    610

User
620

Remote
Device
630

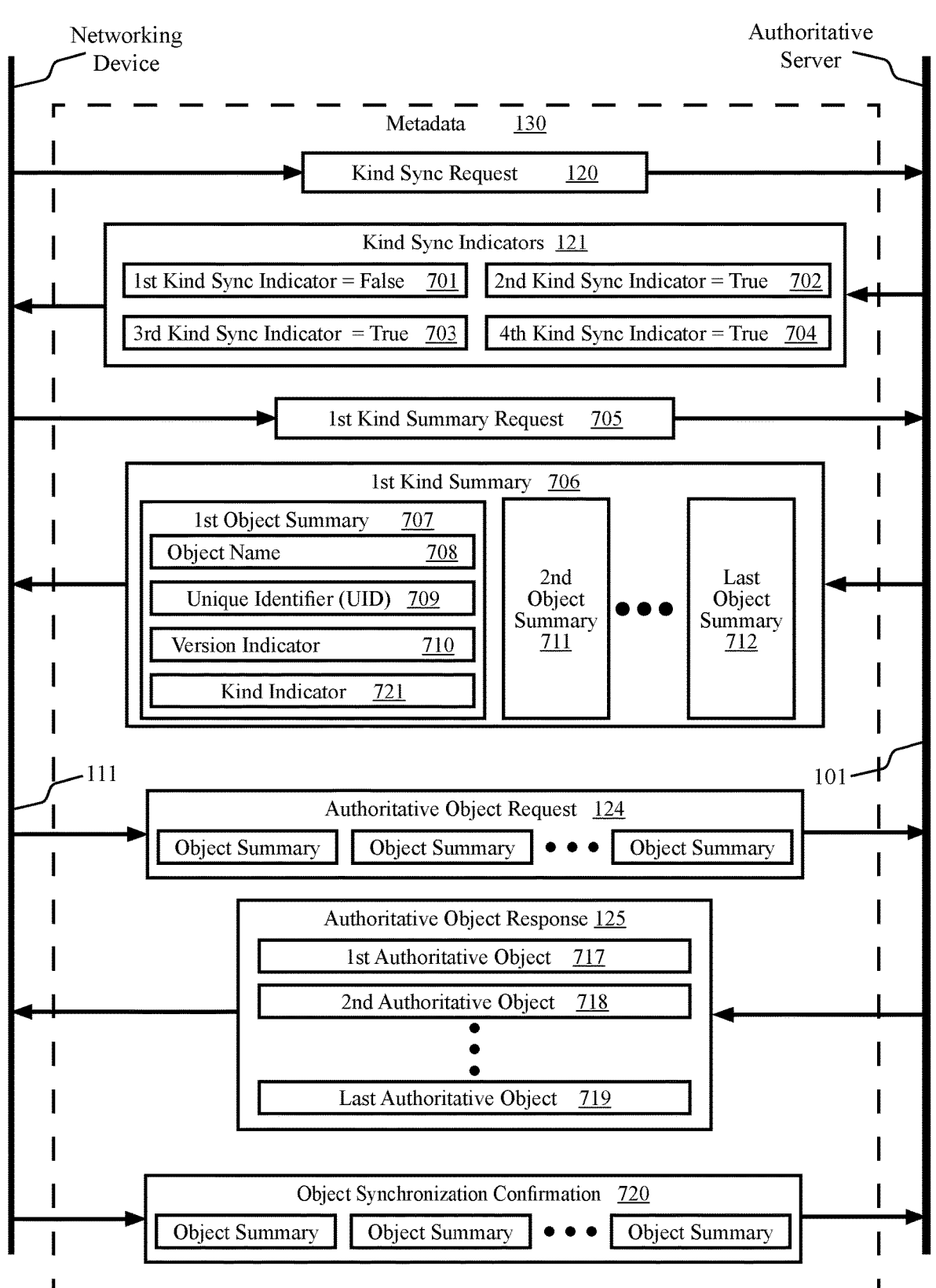

Networking Device

Authoritative Server

Metadata    130

Kind Sync Request    120

Kind Sync Indicators  121
1st Kind Sync Indicator = False    701
2nd Kind Sync Indicator = True    702
3rd Kind Sync Indicator  = True  703
4th Kind Sync Indicator = True  704

1st Kind Summary Request    705

1st Kind Summary  706
1st Object Summary    707
Object Name    708
Unique Identifier (UID)  709
Version Indicator    710
Kind Indicator  721

2nd Object Summary 711

Last Object Summary 712

111

101

Authoritative Object Request  124
Object Summary    Object Summary    • • •    Object Summary Authoritative Object Response 125
1st Authoritative Object  717
2nd Authoritative Object  718
Last Authoritative Object  719

Object Synchronization Confirmation  720
Object Summary    Object Summary    • • •    Object Summary

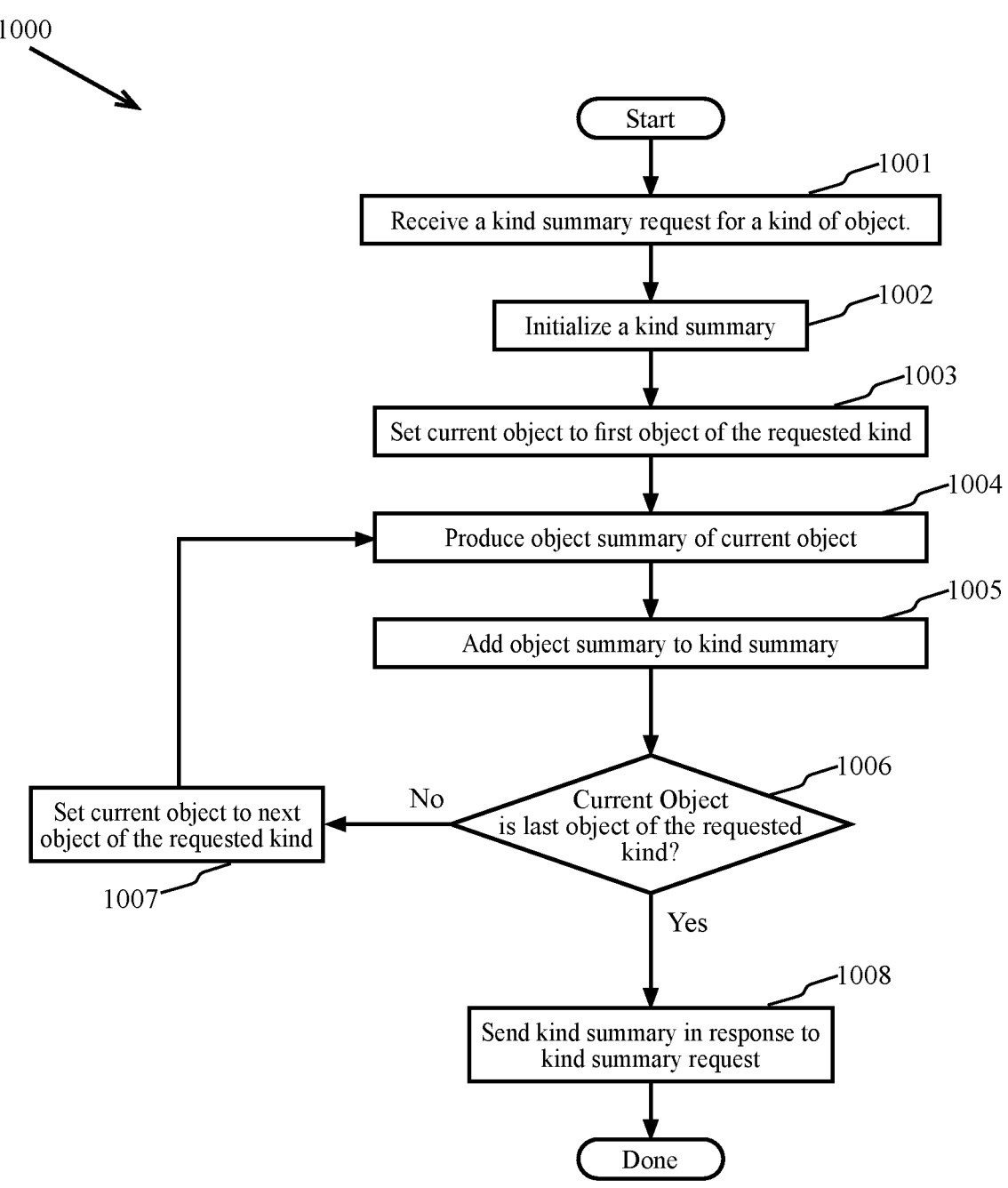

Start

Receive a kind summary request for a kind of object.        1001

Initialize a kind summary        1002

Set current object to first object of the requested kind        1003

Produce object summary of current object        1004

Add object summary to kind summary        1005

Current Object
is last object of the requested
kind?        1006

No

Set current object to next
object of the requested kind
1007

Yes

Send kind summary in response to
kind summary request        1008

Done

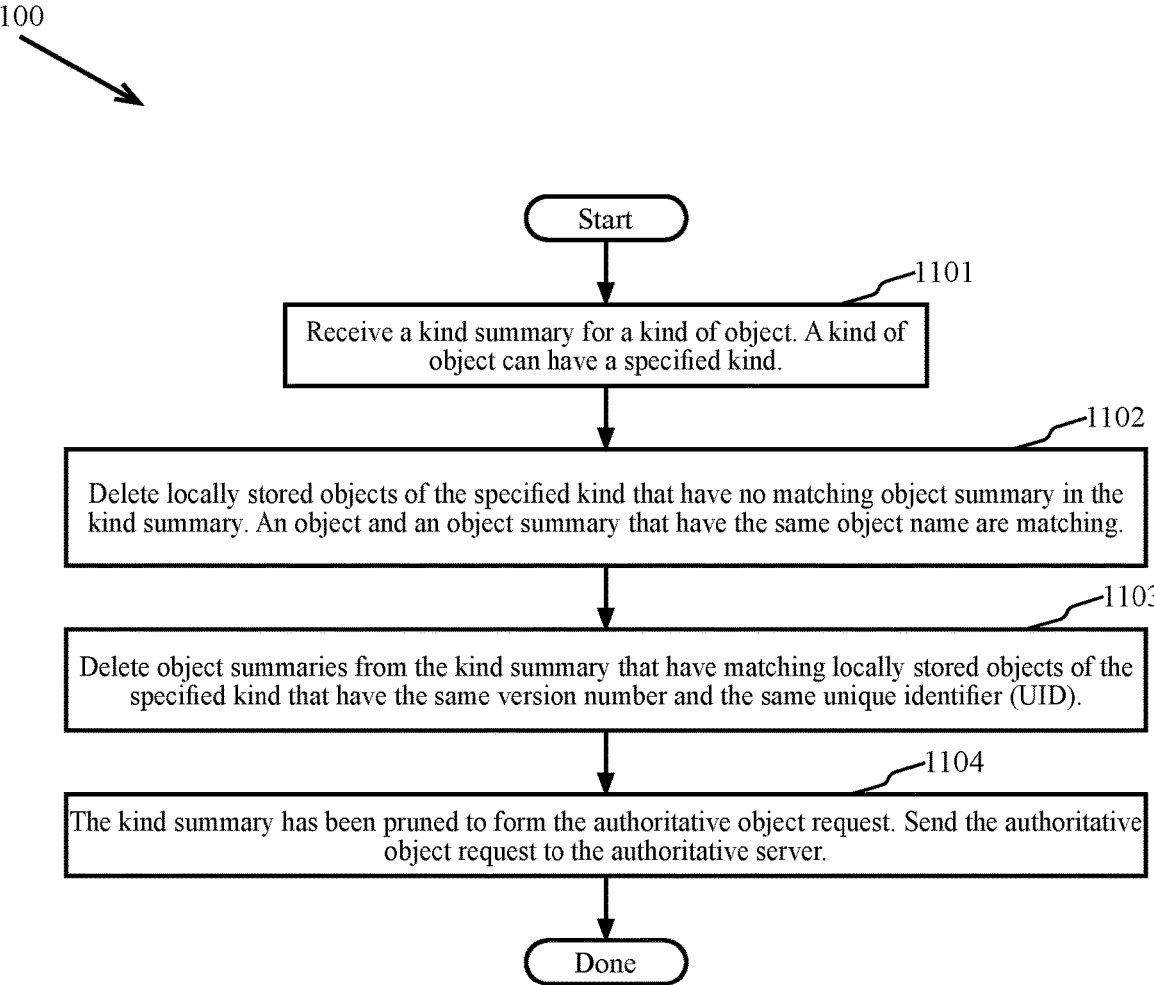

Start

1101

Receive a kind summary for a kind of object. A kind of object can have a specified kind.

1102

Delete locally stored objects of the specified kind that have no matching object summary in the kind summary. An object and an object summary that have the same object name are matching.

1103

Delete object summaries from the kind summary that have matching locally stored objects of the specified kind that have the same version number and the same unique identifier (UID).

1104

The kind summary has been pruned to form the authoritative object request. Send the authoritative object request to the authoritative server.

Done

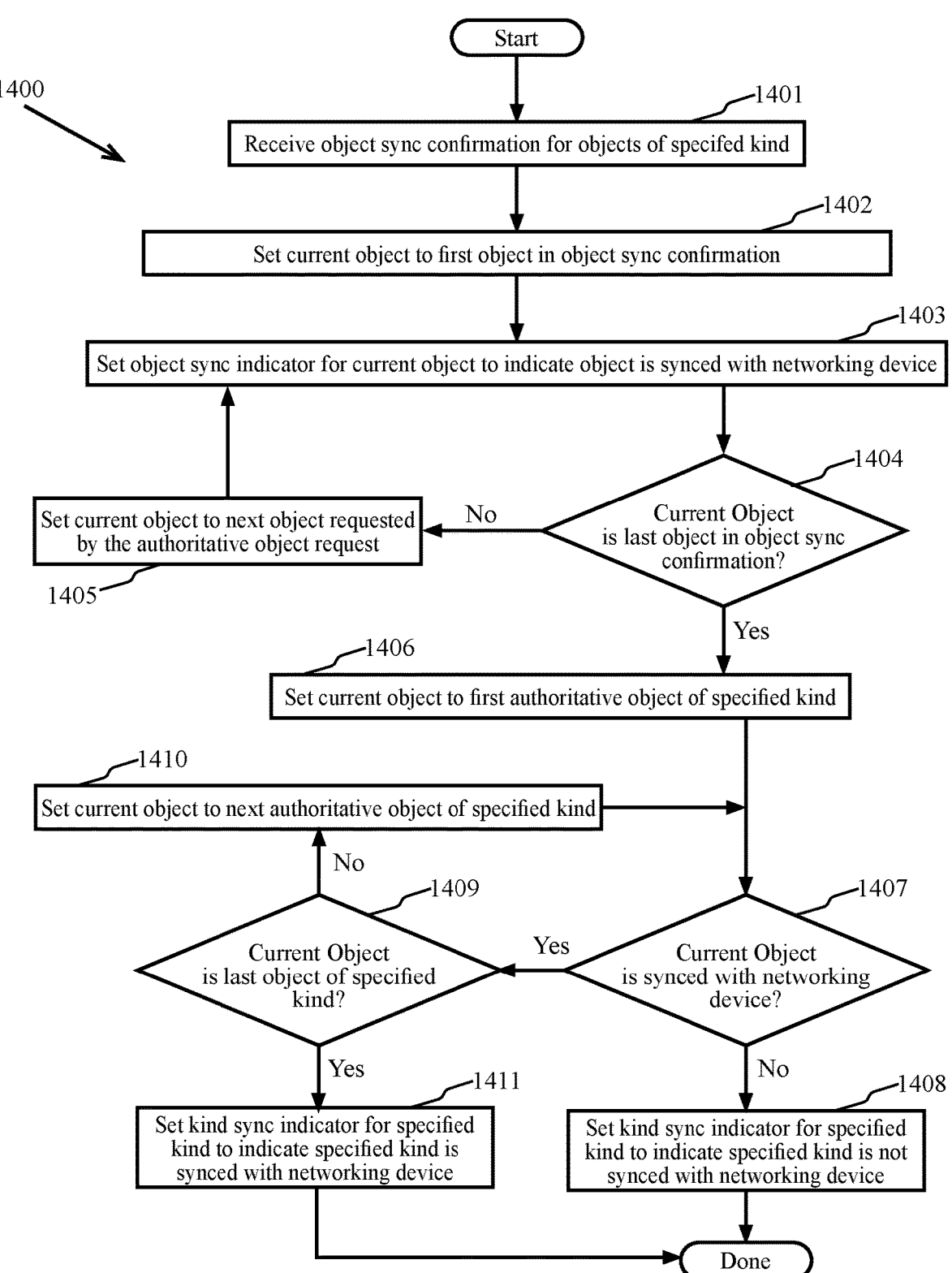

1400

1401 Receive object sync confirmation for objects of specifed kind

1402 Set current object to first object in object sync confirmation

1403 Set object sync indicator for current object to indicate object is synced with networking device 1404 Current Object is last object in object sync confirmation?

No — 1405 Set current object to next object requested by the authoritative object request Yes 1406 Set current object to first authoritative object of specified kind 1410 Set current object to next authoritative object of specified kind No 1409 Current Object is last object of specified kind?

Yes — 1407 Current Object is synced with networking device?

No

Yes

1411 Set kind sync indicator for specified kind to indicate specified kind is synced with networking device 1408 Set kind sync indicator for specified kind to indicate specified kind is not synced with networking device Done

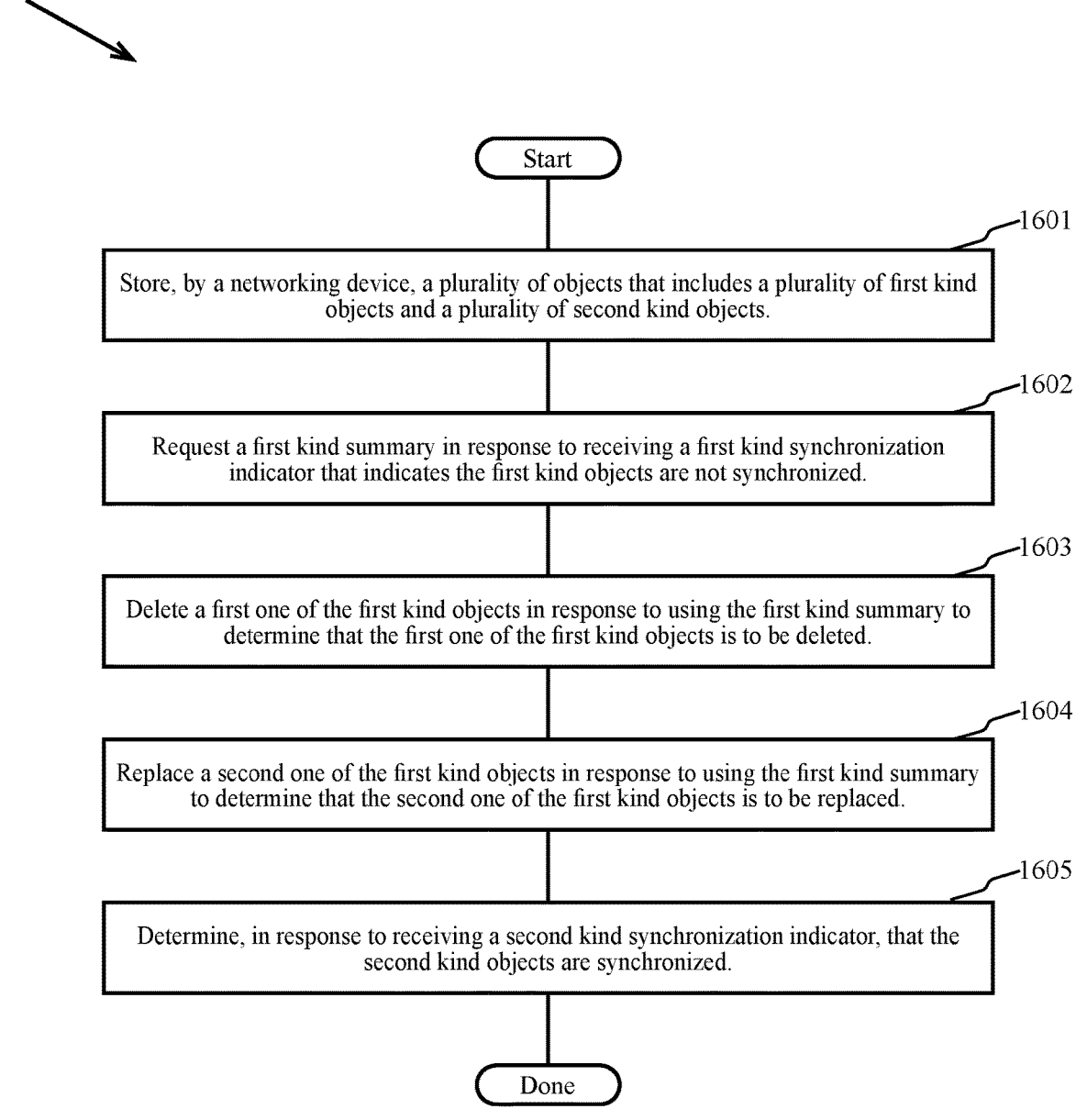

Start

——1601

Store, by a networking device, a plurality of objects that includes a plurality of first kind objects and a plurality of second kind objects.

——1602

Request a first kind summary in response to receiving a first kind synchronization indicator that indicates the first kind objects are not synchronized.

——1603

Delete a first one of the first kind objects in response to using the first kind summary to determine that the first one of the first kind objects is to be deleted.

——1604

Replace a second one of the first kind objects in response to using the first kind summary to determine that the second one of the first kind objects is to be replaced.

——1605

Determine, in response to receiving a second kind synchronization indicator, that the second kind objects are synchronized.

Done

FIG. 16

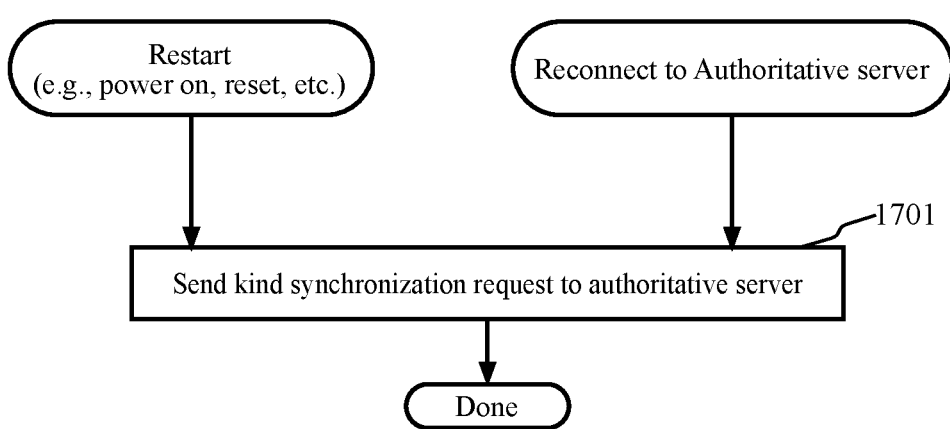
FIG. 17

1800

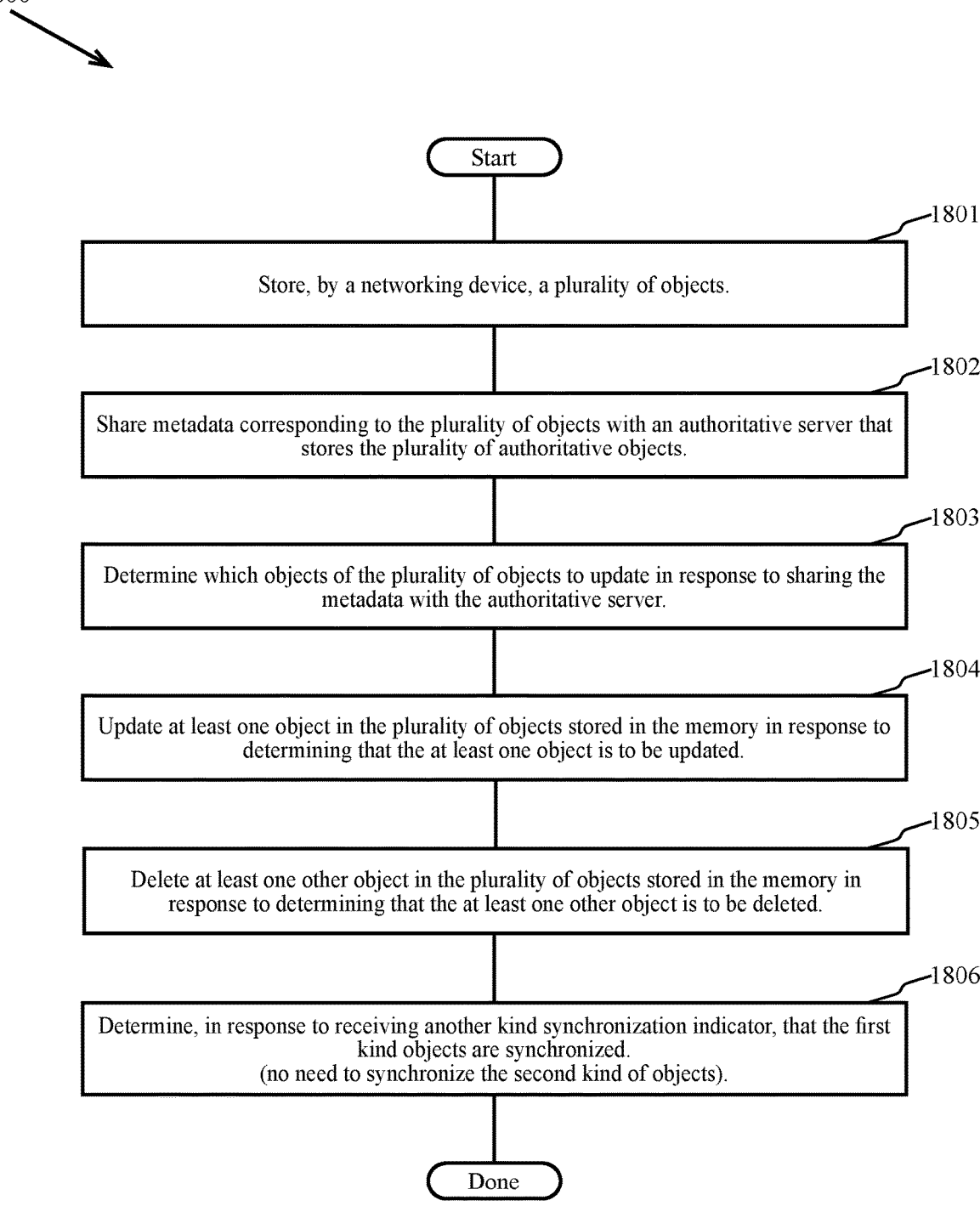

Start

1801
Store, by a networking device, a plurality of objects.

1802
Share metadata corresponding to the plurality of objects with an authoritative server that stores the plurality of authoritative objects.

1803
Determine which objects of the plurality of objects to update in response to sharing the metadata with the authoritative server.

1804
Update at least one object in the plurality of objects stored in the memory in response to determining that the at least one object is to be updated.

1805
Delete at least one other object in the plurality of objects stored in the memory in response to determining that the at least one other object is to be deleted.

1806
Determine, in response to receiving another kind synchronization indicator, that the first kind objects are synchronized.
(no need to synchronize the second kind of objects).

Done

FIG. 18

SYSTEMS AND METHODS FOR SYNCHRONIZING DIFFERENT KINDS OF OBJECTS WITH AUTHORITATIVE OBJECTS

TECHNICAL FIELD

The systems and methods relate to computer networks, servers, local area networks, networking devices, and data synchronization. A router, a switch, a network interface card (NIC), a smartNIC, and a distributed service card (DSC), are examples of networking devices. The systems and methods also relate to devices, such as networking devices, synchronizing local stored objects with authoritative objects stored by an authoritative server.

BACKGROUND

Networking devices process network flows by receiving network packets and processing the network packets. The network packets are often processed by examining the packet's header data and applying networking rules such as routing rules, firewall rules, load balancing rules, etc. In large networks, the networking rules for many networking devices can be stored as authoritative objects that are sent to the networking devices by an authoritative server. The networking devices store the authoritative objects as locally stored objects and are thereby configured with networking rules.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

An aspect of the subject matter described in this disclosure can be implemented by a system device. The system can include a memory configured to store a plurality of objects, and a processor communicatively coupled to the memory, wherein the processor and the memory are configured to synchronize the plurality of objects with a plurality of authoritative objects, wherein synchronizing the plurality of objects with the plurality of authoritative objects includes sending and receiving metadata corresponding to the plurality of objects and to the plurality of authoritative objects, using the metadata to determine which objects of the plurality of objects to update in response to receiving the metadata, and updating at least one object in the plurality of objects stored in the memory in response to determining that the at least one object is to be updated.

Another aspect of the subject matter described in this disclosure can be implemented by a system device. The system can include an authoritative server configured to store a plurality of authoritative objects that includes a plurality of authoritative first kind objects, store an object synchronization indicator that indicates none of a plurality of objects stored by a networking device is synchronized with a first one of the authoritative objects, produce a first kind synchronization indicator that indicates at least one of the objects is not synchronized with the authoritative first kind objects, send the first kind synchronization indicator to the networking device in response to a kind synchronization request, use the authoritative objects to produce a first kind summary that is sent to the networking device in response to receiving a first kind summary request, and send an authoritative object in response to receiving an authoritative object request.

Yet another aspect of the subject matter described in this disclosure can be implemented in a method. The method can include storing, by a networking device, a plurality of objects that includes a plurality of first kind objects, requesting a first kind summary in response to receiving a first kind synchronization indicator that indicates the first kind objects are not synchronized, deleting a first one of the first kind objects in response to using the first kind summary to determine that the first one of the first kind objects is to be deleted, replacing a second one of the first kind objects in response to using the first kind summary to determine that the second one of the first kind objects is to be replaced, and determining, in response to receiving another first kind synchronization indicator, that the first kind objects are synchronized.

In some implementations of the methods and devices, the plurality of objects includes a plurality of first kind objects, sending the metadata includes requesting a first kind summary in response to receiving a first kind synchronization indicator that indicates the first kind objects are not synchronized, updating the at least one object includes replacing one of the first kind objects with one of the authoritative objects in response to using the first kind summary to determine that the one of the first kind objects is to be replaced, synchronizing the plurality of objects with the plurality of authoritative objects further includes deleting a second one of the first kind objects in response to using the first kind summary to determine that the second one of the first kind objects is to be deleted, and determining which objects of the plurality of objects to update includes determining, in response to receiving another first kind synchronization indicator, that the first kind objects are synchronized. In some implementations of the methods and devices, the first kind summary includes a plurality of object summaries that each has an object name, and the second one of the first kind objects is deleted in response to determining that the object name of the second one of the first kind objects does not match the object name of any of the object summaries. In some implementations of the methods and devices, the first kind summary includes an object summary that includes an object name, and a unique identifier (UID). Furthermore, the second one of the first kind objects is replaced in response to determining that the object name of the second one of the first kind objects matches the object name of the object summary and that the UID of the second one of the first kind objects does not equal the UID of the object summary.

In some implementations of the methods and devices, the processor and the memory are further configured to request the first kind synchronization indicator by sending a kind synchronization request to an authoritative server. In some implementations of the methods and devices, the processor and the memory are further configured to request the first kind summary from an authoritative server configured to produce the first kind summary from a plurality of authoritative first kind objects that are included in the authoritative objects. In some implementations of the methods and devices, the processor and the memory are further configured to request an authoritative object in response to determining that the one of the first kind objects is to be replaced, and replace the one of the first kind objects with the authoritative object. In some implementations of the methods and devices, the processor and the memory are further configured to request an authoritative first kind object that has an object name in response to determining that an object summary in the first kind summary has the object name and that none of the first kind objects have the object name, and add the authoritative first kind object to the first kind objects that are stored in the memory.

In some implementations of the methods and devices, the first kind summary includes an object summary that includes an object name, a unique identifier (UID), and a version indicator, and a third one of the first kind objects is updated in response to determining that the object name of the third one of the first kind objects matches the object name of the object summary, that the UID of the third one of the first kind objects is equal to the UID of the object summary, and that the version indicator of the third one of the first kind objects does not equal the version indicator of the object summary. In some implementations of the methods and devices, the processor and the memory are further configured to request an authoritative object in response to determining that the third one of the first kind objects is to be updated, and use the authoritative object to update the third one of the first kind objects. In some implementations of the methods and devices, the devices further include an authoritative server, the authoritative server configured to store the authoritative objects, store an object synchronization indicator that indicates none of the objects is synchronized with one of the authoritative objects, and share the metadata with a device that includes the memory and the processor, wherein the authoritative server is configured to produce the first kind synchronization indicator, the first kind summary, and an object summary. The metadata can include the first kind synchronization indicator, the first kind summary, and the object summary. The object summary can include a UID of one of the authoritative objects. In some implementations of the methods and devices, a networking device includes the memory and the processor, the networking device is configured to process a plurality of network packets in accordance with a plurality of routing rules and a plurality of firewall rules, the plurality of objects includes a plurality of first kind objects and a plurality of second kind objects, the routing rules are the plurality of first kind objects, and the firewall rules are the plurality of second kind objects.

In some implementations of the methods and devices, the authoritative objects include a plurality of authoritative second kind objects, and the authoritative server is further configured to produce a second kind synchronization indicator that indicates the objects are synchronized with the authoritative second kind objects, and send the second kind synchronization indicator to the networking device in response to the kind synchronization request. In some implementations of the methods and devices, the authoritative server is further configured to receive an object synchronization confirmation that indicates synchronization between one of the authoritative objects and one of the of objects, and use the object synchronization confirmation to update the first kind synchronization indicator. In some implementations of the methods and devices, the first kind summary includes a plurality of object summaries of the authoritative first kind objects, and the object summaries include an object name, a unique identifier (UID), and a version indicator. In some implementations of the methods and devices, the system further includes the networking device, wherein the networking device is configured to store a plurality of objects that includes a plurality of first kind objects, request the first kind summary in response to receiving the first kind synchronization indicator, the first kind synchronization indicator indicating that the first kind objects are not synchronized with the authoritative objects, delete a first one of the objects in response to using the first kind summary to determine that the first one of the objects is to be deleted, and replace a second one of the objects in response to using the first kind summary to determine that the second one of the objects is to be replaced.

In some implementations of the methods and devices, the first kind objects are a plurality of routing rules, and the networking device is configured to process a plurality of network packets according to the routing rules. In some implementations of the methods and devices, the method further includes requesting the first kind synchronization indicator and a second kind synchronization indicator by sending a kind synchronization request to an authoritative server storing a plurality of authoritative objects that includes a plurality of authoritative first kind objects and a plurality of authoritative second kind objects, requesting the first kind summary from the authoritative server, requesting an authoritative object from the authoritative server in response to determining that one of the first kind objects is to be replaced or updated, and replacing or updating the one of the first kind objects with the authoritative object.

These and other aspects will become more fully understood upon a review of the detailed description, which follows. Other aspects and features will become apparent to those of ordinary skill in the art, upon reviewing the following description of specific examples in conjunction with the accompanying figures. While features may be discussed relative to certain examples and figures below, any example may include one or more of the advantageous features discussed herein. In other words, while one or more examples may be discussed as having certain advantageous features, one or more of such features may also be used in accordance with the various examples discussed herein. In similar fashion, while the examples may be discussed below as devices, systems, or methods, the examples may be implemented in various devices, systems, and methods.

BRIEF DESCRIPTION OF THE DRAWINGS

FIG. 3A is a high-level flow diagram illustrating a process for setting a kind synchronization indicator to false in response to receiving a kind updated notification, according to some aspects.

FIG. 3B is a high-level flow diagram illustrating a process for responding to various requests, according to some aspects. The illustrated processes may be performed by an authoritative server.

FIG. 7 a high level block diagram illustrating requests and responses sent to and received by devices implementing fast object synchronization, according to some aspects.

FIG. 10 is a high-level flow diagram illustrating a process for producing a kind summary in response to a kind summary request, according to some aspects.

FIG. 11 is a high-level flow diagram illustrating a process for comparing a kind summary to locally stored objects and produces an object request, according to some aspects.

FIG. 14 is a high-level flow diagram illustrating a process for using an authoritative object synchronization confirmation to update object synchronization indicators and kind sync indicators, according to some aspects.

FIG. 16 is a high-level flow diagram illustrating a method for fast object synchronization, according to some aspects.

FIG. 17 is a high level flow diagram illustrating a process for sending a kind synchronization request upon startup or reconnecting to an authoritative server, according to some aspects.

FIG. 18 is a high-level flow diagram illustrating another method for fast object synchronization, according to some aspects.

Throughout the description, similar reference numbers may be used to identify similar elements.

DETAILED DESCRIPTION

Figure 1:
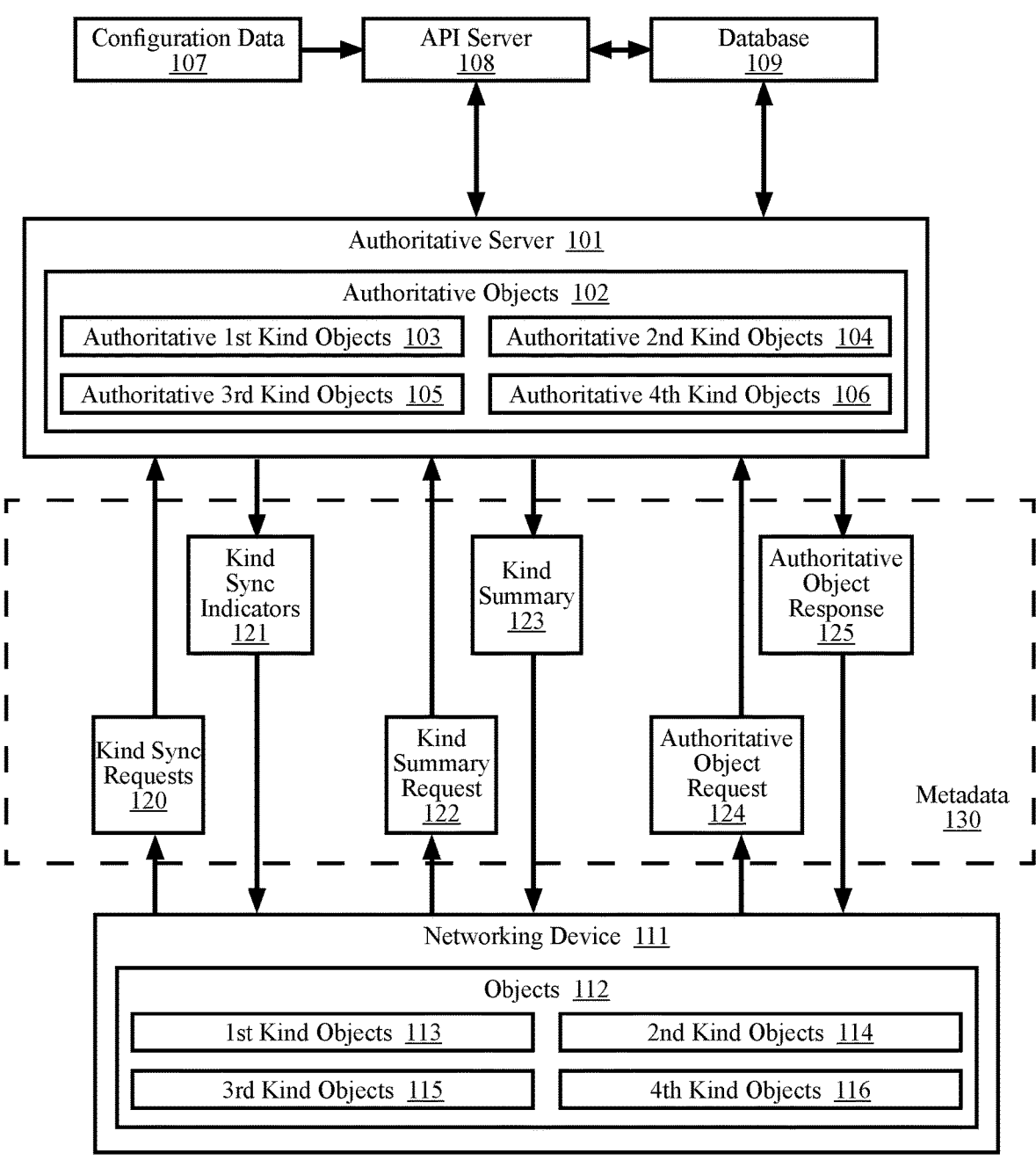
FIG. 1 is a high-level conceptual diagram illustrating objects stored by a networking device being synchronized with authoritative objects provided by an authoritative server, according to some aspects.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

Systems and methods that implement aspects may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one example. Thus, discussions of the features and advantages, and similar language, throughout this specification may, but do not necessarily, refer to the same example.

Furthermore, the described features, advantages, characteristics, and aspects may be combined in any suitable manner in one or more systems or methods. One skilled in the relevant art will recognize, in light of the description herein, that one example may be practiced without one or more of the specific features or advantages of another example. In other instances, additional features and advantages may be recognized in one example that may not be present in all the examples.

Reference throughout this specification to "one example", "an example", or similar language means that a particular feature, structure, or characteristic described in connection with the indicated example is included in at least one example. Thus, the phrases "in one example", "in an example", and similar language throughout this specification may, but do not necessarily, all refer to the same example.

Data centers can have thousands or tens of thousands of networking devices (e.g., switches, routers, NICs, smart-NICs, DSCs, etc.). The networking devices process network packets in accordance with networking rules (e.g., firewall rules, routing rules, network address translation (NAT) rules, encapsulation rules, etc.) that have been provided by data center administrators, data center tenants, and other personnel. The networking rules change often, which may necessitate synchronizing the networking rules that are locally stored by the networking devices with the most current versions of the networking rules that are stored by an authoritative server. For example, synchronization may be necessary when a networking device restarts or reconnects to the authoritative server. Simplistic schemes for synchronizing network rules that are locally stored by the networking devices with the most current versions of the networking rules consume network bandwidth, the processing capacity of networking devices, and other expensive resources.

A networking device may selectively synchronize the networking rules with an authoritative server. Selectively syncing the networking rules may include two selection steps followed by synchronizing the network rules that are selected. There can be different kinds of networking rules (e.g., routing rules, firewall rules, etc.) that can be stored as kinds of objects (e.g., routing rule objects, firewall rule objects, etc.). The first selection step can select the kinds of objects that may need to be synchronized. The second synchronization step can select specific objects of the selected kinds. The networking device may then sync the selected objects to authoritative objects stored by the authoritative server. The networking device and the authoritative server may exchange metadata to thereby select the objects to synchronize. For example, kind synchronization indicators can indicate that the objects of a first kind (e.g., routing rules) are out of sync and that objects of a second kind (e.g., firewall rules) are synced. Kind summaries for the kinds of objects to be synced are therefore requested (e.g., a first kind summary), but kind summaries for the other kinds of objects (e.g., a second kind summary) are not requested. Objects that are to be added, deleted, updated, or replaced are identified by comparing the networking device's locally stored objects to the kind summaries. Authoritative versions of the objects to be added, updated, or replaced are requested and then used to sync the locally stored objects. A technique implemented at the network device may involve sharing metadata (e.g., kind synchronization indicators, kind summaries, etc.) corresponding to a set of objects with an authoritative server that stores a set of authoritative objects, determining which objects to update in response to sharing the metadata with the authoritative server, and updating at least one object in the set of objects in response to determining that the at least one object may need to be updated.

Selectively synchronizing the objects with the authoritative objects may include analyzing certain kinds of objects, but not analyzing other kinds of objects, to identify objects that are not synced. Furthermore, the authoritative objects that may be requested may be those needed for syncing the identified objects while others are not requested. As such, network bandwidth may be preserved and processing requirements may be reduced. The networking device may have no need to alter its internal configurations based on objects that are already synchronized. The networking device may alter its internal configuration based on the kind of objects that have changed without also altering its internal configuration based on the kind of objects that have not changed. For example, a change to a routing rule for one network flow may result in the networking device requesting and processing routing rule summary and synchronizing the routing rule object without requesting and syncing other objects. Furthermore, the networking device may change its internal configuration for routing that one network flow without also changing its internal configurations for other network flows.

FIG. 1 is a high-level conceptual diagram illustrating objects 112 stored by a networking device 111 being synchronized with authoritative objects 102 provided by an authoritative server 101, according to some aspects. The networking device 111 and the authoritative server 101 can share metadata 130 corresponding to the objects and the authoritative objects. The metadata 130 can include a kind synchronization request 120, kind synchronization indicators 121, a kind summary request 122, a kind summary 123, an authoritative object request 124, and an authoritative object response 125. The metadata can be used for determining which objects to update, add, replace, or remove. An object can be updated in response to determining, via the metadata, that the object may need to be updated.

Users and other entities can provide configuration data 107 to an application programming interface (API) server 108. The configuration data 107 can be networking rules that can be stored as authoritative objects 102. The authoritative objects 102 can be stored in an authoritative server 101 or in a database 109 that the authoritative server 101 can access. Data that the server accesses through a network (e.g., network attached storage, storage area networks, etc.) or via database queries may be considered equivalent to data stored by memory in the server. An authoritative object can be a kind of authoritative object. For example, an authoritative object can be a first kind of object or a routing rule kind of object. A list of the kinds of objects includes routing rules, firewall rules, NAT rules, encryption rules, decryption rules, packet encapsulation rules, packet rewriting rules, forwarding rules, prioritization rules, and other rules known in the art. "Kind" therefore can denote a particular type or a group of objects with similar characteristics. For example, a routing rule can be stored as an authoritative routing rule object that can be a routing rule kind of object. The kind of the object may therefore be "routing rule" or "routing rule kind". For generality, the kinds can be enumerated (e.g., first kind, second kind, etc.). For example, the routing rule kind can be the first kind, the firewall rule kind can be the second kind, the NAT rule kind can be the third kind, the packet encapsulation rule kind can be the fourth kind, and so forth. The authoritative objects 102 can include authoritative first kind objects 103 (e.g., authoritative routing rule objects), authoritative second kind objects 104 (e.g., authoritative firewall rule objects), authoritative third kind objects 105 (e.g., authoritative NAT rule objects), and authoritative fourth kind objects 106 (e.g., authoritative packet encapsulation rule objects). In some implementations, the authoritative server can receive a notification in response to an authoritative object changing in the database. In response to receiving the notification that an authoritative object has changed, the authoritative server 101 can set an object synchronization indicator to indicate that none of the networking devices are storing an object that is synchronized with the authoritative object. The authoritative object that changed is a kind of object (e.g., first kind, second kind, etc.). The authoritative server can set a kind synchronization indicator indicating that none of the networking devices are synchronized for that kind of object. For example, if the object is a first kind object (e.g., a routing rule object), then a first kind synchronization indicator (e.g., a routing rule synchronization indicator) can be set to false. A kind synchronization indicator for a kind of object may be set to false in response to an object of that kind being deleted. A kind synchronization indicator for a kind of object may be set to indicate that a networking device is synchronized for that kind of object in response to determining that all the networking device's objects of that kind are synchronized with authoritative objects. For brevity, kind synchronization indicators may be referred to as kind sync indicators. Kind sync indicators may indicate that a kind of object stored by a networking device is out of sync with the authoritative objects 102.

A networking device 111 can store objects 112 such as first kind objects 113 (e.g., routing rule objects), second kind objects 114 (e.g., firewall rule objects), third kind objects 115 (e.g., NAT rule objects), and fourth kind objects 116 (e.g., packet encapsulation rule objects). Note that the first kind objects and the authoritative first kind objects are of the first kind. For example, a routing rule object is a routing rule kind of object and an authoritative routing rule object is a routing rule kind of authoritative object. A first kind object is a first kind of object and is of the first kind (e.g., routing rule object is a routing rule kind of object and is an object of the routing rule kind). An authoritative first kind object is a first kind of authoritative object and is of the first kind. The second kind objects and the authoritative second kind objects are of the second kind (e.g., the firewall rule kind). A second kind object is a second kind of object and is of the second kind. An authoritative second kind object is a second kind of authoritative object and is of the second kind. The third kind objects and the authoritative third kind objects are of the third kind (e.g., the NAT rule kind). A third kind object is a third kind of object and is of the third kind. An authoritative third kind object is a third kind of authoritative object and is of the third kind. The fourth kind objects and the authoritative fourth kind objects are of the fourth kind (e.g., the packet encapsulation rule kind). A fourth kind object is a fourth kind of object and is of the fourth kind. An authoritative fourth kind object is a fourth kind of authoritative object and is of the fourth kind.

The networking device 111 can send a kind synchronization request 120 to the authoritative server 101. The kind sync request 120 can request kind synchronization indicators 121 for all the kinds of objects. Alternatively, the kind sync request 120 can request a kind sync indicator for one of the kinds of objects, or can request kind sync indicators for some of the kinds of objects. For example, the kind synchronization request can include a list of kinds of objects (e.g., first kind, second kind, etc.) for which it requests kind sync indicators. The authoritative server 101 can send kind sync indicators 121 to the networking device in response to the kind sync requests 120. The networking device 111 can send a kind summary request 122 to the authoritative server 101. The kind summary request 122 may indicate the kind of object for which a kind summary is requested. The authoritative server 101 can send a kind summary 123 to the networking device in response to the kind summary request 122. The kind summary 123 can include object summaries of all the authoritative objects of the requested kind that the networking device may receive. For example, the kind summary request 122 can request first kind object summaries. The authoritative server may store authoritative first kind objects for numerous networking devices and may store data indicating which of the authoritative objects is to be sent to which of the networking devices. The same authoritative object may be sent to multiple networking devices.

The networking device 111 can use the kind summary 123 to identify which of the authoritative objects 102 are needed such that the objects of the requested kind (e.g., first kind objects 113) can be synchronized with the authoritative objects. The networking device 111 can send an authoritative object request 124 to the authoritative server 101 requesting those objects. The authoritative server 101 can send an authoritative object response 125 to the networking device 111 in response to the authoritative object request 124. The authoritative object response 125 can include the authoritative objects requested by the authoritative object request 124.

In some implementations, the authoritative server may set a kind synchronization indicator to indicate that the networking device may be out of sync for a specific kind of object. The kind synchronization indicator may be set to indicate that the networking device is out of sync in response to receiving the notification that an authoritative object of that kind has changed, but may or may not also set an object synchronization indicator for that specific object at that time. Object synchronization indicators may be set for the authoritative objects that are in the authoritative object response 125 and may be cleared in response to the networking device confirming synchronization with each of those requested authoritative objects. For example, the authoritative server may create a list of objects being synchronized at the same time as it creates the authoritative object response. An object may be removed from that list in response to the networking device confirming to the authoritative server that the object is synced. The authoritative server 101 may set the kind sync indicator for the requested kind of object to indicate that the networking device 111 has fully synchronized the requested kind in response to the last item being removed from the list.

Figure 2:
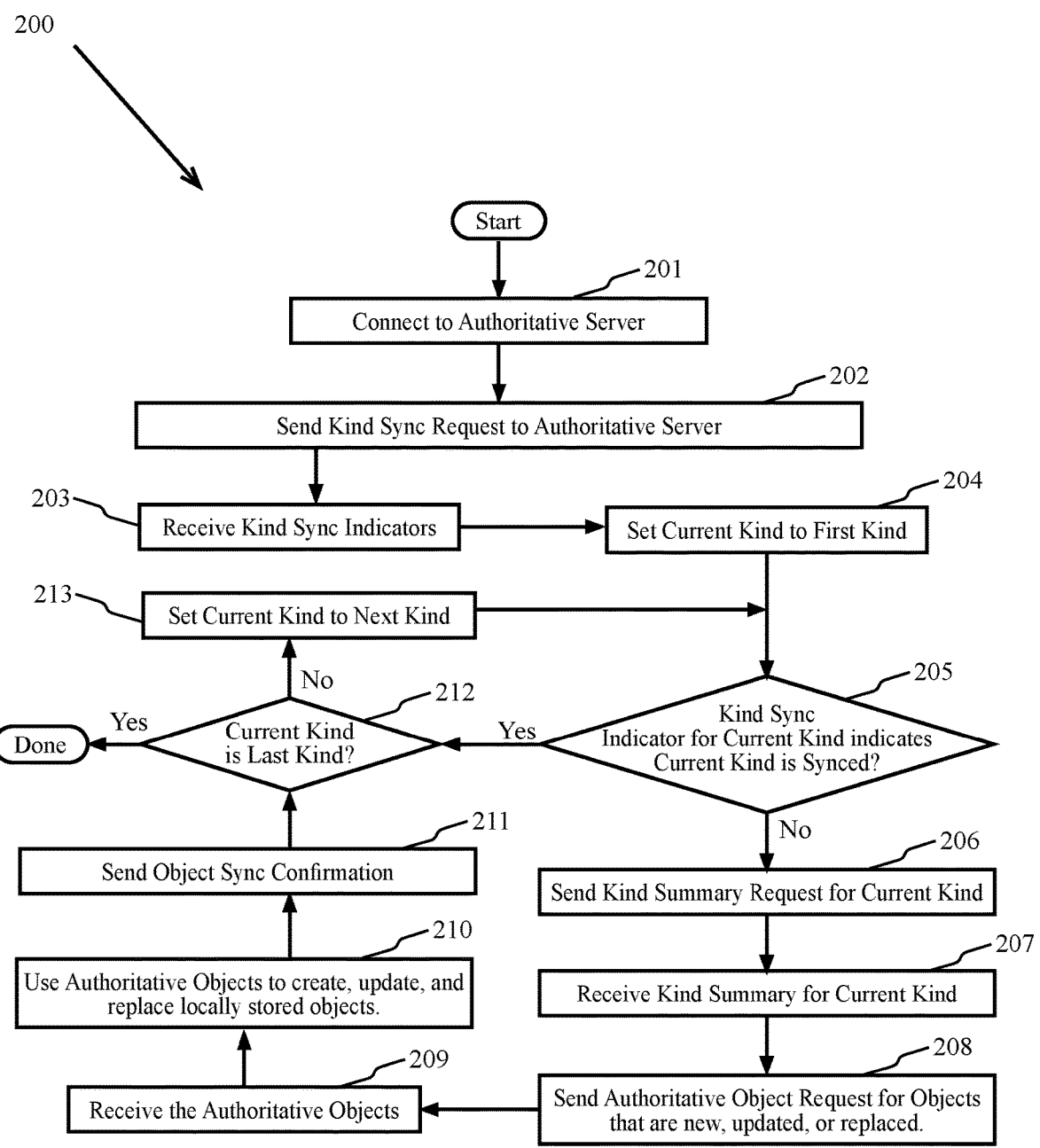
FIG. 2 is a high-level flow diagram illustrating a process for synchronizing objects with authoritative objects available from an authoritative server, according to some aspects.

FIG. 2 is a high-level flow diagram illustrating a process 200 for synchronizing objects with authoritative objects available from an authoritative server, according to some aspects. The objects can be networking rules and the illustrated process may be performed by a networking device implementing networking rules that are stored as the objects 112. This process may be automatically run when the networking device 111 starts up or after communication with the authoritative server 101 has been lost and reestablished. After the start, at block 201 the networking device can connect to the authoritative server. At block 202, a kind sync request (for brevity, "sync" may be used instead of "synchronization") can be sent to the authoritative server 101. At block 203, kind sync indicators can be received from the authoritative server 101. Kind sync indicators for many kinds of objects may be received. At block 204, current kind can be set to a first kind. At decision block 205, the process can determine whether the kind sync indicator for the current kind indicates that the objects of the current kind are synchronized with the authoritative objects. The process moves to decision block 212 from decision block 205 in response to determining that the kind sync indicator for the current kind indicates that the objects of the current kind are synchronized with the authoritative objects and otherwise moves to block 206. At block 206, a kind summary request for the current kind can be sent to the authoritative server. At block 207, a kind summary can be received. The kind summary can be responsive to the kind summary request sent at block 206. At block 208, an authoritative object request can be sent to the authoritative server to thereby request authoritative objects that are new, updated, or replaced. At block 209, the authoritative objects requested in the authoritative object request are received. At block 210, the authoritative objects are used to create, update, and replace locally stored objects 112. At block 211, one or more object sync confirmation can be sent to the authoritative server 101 to thereby indicate that the objects of the current kind are synchronized with the authoritative objects. At decision block 212 the process determines whether current kind is the last kind. The process is done if the current kind is the last kind at decision block 212 and otherwise moves to block 213. At block 213, current kind can be set to the next kind before the process loops back to decision block 205.

FIG. 3A is a high-level flow diagram illustrating a process 300 for setting a kind synchronization indicator to false in response to receiving a kind updated notification, according to some aspects. The processes illustrated in FIG. 3A may be performed by an authoritative server. After the start, at block 302, the process can receive a kind changed notification. The kind changed notification can indicate the kind of the object that was changed and can indicate that an authoritative object of the indicated kind has been added, deleted, replaced, updated, etc. At block 303 that process can set a kind sync indicator for the indicated kind to indicate that an object of the indicated kind stored by a networking device might not be synchronized with the authoritative objects. In deployments having numerous networking devices there may be kind sync indicators for each of the networking devices such that each of the networking devices may synchronize its locally stored objects by following a process such as that shown in FIG. 2.

FIG. 3B is a high-level flow diagram illustrating a process 309 for responding to various requests, according to some aspects. The processes illustrated in FIG. 3B may be performed by an authoritative server that can produce kind synchronization indicators and kind summaries. After the start, the process can enter a wait state 310 while waiting for a request from a networking device. The process can move to decision block 312 in response to receiving a kind sync request 311. At decision block 312 the process can check if kind sync indicators for the networking device are stored by the authoritative server. The process can move to block 314 in response to determining that the authoritative server stores kind sync indicators for the networking device and can otherwise move to block 313. At block 313, the process can initialize kind sync indicators for the networking device before moving to block 314. At block 314 the process can send the kind sync indicators to the networking device before going back to the wait state 310. The kind sync indicators can be sent to the networking device in a kind sync response that includes one or more kind sync indicators.

The process can move to decision block 322 in response to receiving a kind summary request 321 for a kind of object. At decision block 322 the process can check if the authoritative server stores a kind summary that is current for the requested kind. For example, an authoritative server may regularly generate kind summaries for the networking devices or may retain a previously generated kind summary for a kind until an authoritative object of that kind is added, deleted, or changed, thereby invalidating the previously generated kind summary. For example, a snapshot timestamp can indicate the time that a previously generated kind summary for a kind was created and a modified timestamp can indicate the time that an object of the kind was last modified. The previously generated kind summary might not be current if the modified timestamp is more recent than the snapshot timestamp. The process can move to block 324 in response to determining that a kind summary that is current already exists for the requested kind and can otherwise move to block 323. At block 323, the requested kind summary can be created or updated. At block 324 the process can send the requested kind summary to the networking device before going back to the wait state 310. A kind summary response that includes the requested kind summary can be sent to the networking device in response to the kind summary request.

The process can move to block 332 in response to receiving an authoritative object request 331 that requests one or more authoritative objects. At block 332 the process can send the requested authoritative object to the networking device. The requested authoritative object can be sent to the networking device in an authoritative object response that can include numerous requested authoritative objects. The authoritative object response may be sent to the networking device in response to the authoritative object request. The networking device can send an object sync confirmation that confirms that the requested authoritative object has been used to add, update, or replace an object stored by the networking devices. At block 333, the object synchronization confirmation may be received. At block 334, an object sync status indicator for the requested authoritative object can be set to indicate that the objects stored by the networking device are synced to the requested authoritative objects. At decision block 335, the process can determine whether all the authoritative objects having the same kind as the requested authoritative object have been synced to the networking device. Note that the processing for decision block 335 and subsequent blocks and decision blocks may be queued for later execution such that the authoritative server may perform higher priority tasks. For example, sending kind sync indicators and kind summaries to other networking devices may have higher priority than determining, by the authoritative server, that all the authoritative objects having the same kind as the requested authoritative object have been synced to the networking device. The process can move to block 326 in response to determining that all the authoritative objects having the same kind as the requested authoritative object have been synced to the networking device, otherwise the process can go back to the wait state 310. At block 326 the process can set the kind sync indicator for the objects having the same kind as the requested authoritative object to indicate that all the authoritative objects having the same kind as the requested authoritative objects have been synced to the networking device.

Figure 4:
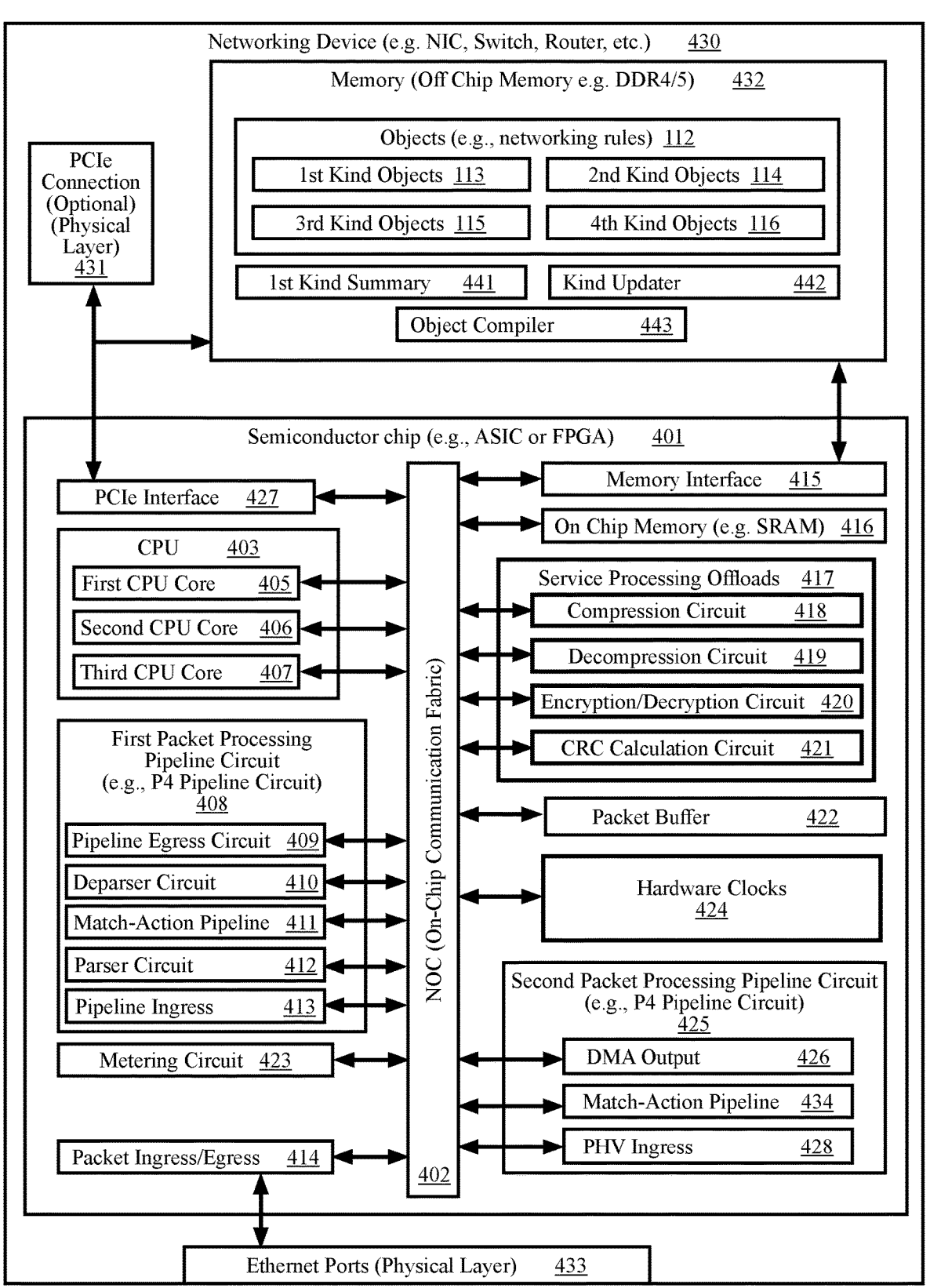
FIG. 4 is a functional block diagram illustrating a networking device configured to implement fast object synchronization with an authoritative server, according to some aspects.

FIG. 4 is a functional block diagram of a networking device 430 having a semiconductor chip 401 such as an application specific integrated circuit (ASIC) and a field programmable gate array (FPGA), according to some aspects. FIG. 4 shows a single semiconductor chip 401 implementing many hardware functions. A different and substantially equivalent implementation may employ a chiplet architecture in which the hardware functions are performed by a group ASICS, the chiplets connected by a communications fabric such as the Infinity Fabric of Advanced Micro Device (AMD) or the universal chiplet express (UCIe) bus. If the networking device is a network interface card (NIC) then the NIC may be installed in a host computer and may act as a networking device for the host computer and for virtual machines running on the host computer. The NIC and the host computer can be communicatively coupled by a peripheral component interconnect express (PCIe) bus. The NIC can have a PCIe connection 431 for communicating with the host computer via a host PCIe connection. The networking device 430 can have a semiconductor chip 401 (or chiplets), off-chip memory 432, and ethernet ports 433. The off-chip memory 432 can be one of the widely available memory modules or chips such as double data rate 5 (DDR5) synchronous dynamic random-access memory (SDRAM) such that the semiconductor chip 401 has access to many gigabytes of memory on the networking device 430. The ethernet ports 433 provide physical connectivity to a computer network such as the internet. The NIC can include a printed circuit board to which the semiconductor chip 401 and the memory 432 are attached.

The semiconductor chip 401 can have many core circuits interconnected by an on-chip communications fabric, sometimes called a network on a chip (NOC) 402. NOCs are often implementations of standardized communications fabrics such as the widely used advanced extensible interface (AXI) bus. The semiconductor chip's core circuits can include a PCIe interface 427, CPU 403, first packet processing pipeline circuit 408, memory interface circuit 415, on-chip memory 416 that may be a static random access memory (SRAM), service processing offloads 417, a packet buffer 422, metering circuit 423, hardware clocks 424, and ingress/egress circuits 414. The PCIe interface 427 can be used to communicate with a host computer via the PCIe connection 431. The CPU 403 can include numerous CPU cores such as a first CPU core 405, a second CPU core 406, and a third CPU core 407. The term "processor" may refer to the CPU 403 or to a CPU core. The CPU 403 and CPU cores can implement a control plane of the networking device.

The control plane can configure the data plane of the networking device to process network packets. Techniques exist for providing flexibility at the data plane of networking devices that are used in data networks. For example, the concept of a domain-specific language for programming protocol-independent packet processors, known simply as "P4," was developed to provide some flexibility at the data plane of a networking device. The document "$P4_{16}$ Language Specification" published by the P4 Language Consortium describes the P4 domain-specific language that may be used for programming the data plane of networking devices. P4 (also referred to herein as the "P4 specification," the "P4 language," and the "P4 program") may be implementable on a large variety of targets including switches, routers, programmable NICs, software switches, semiconductor chip, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The networking device can include packet processing pipeline circuits such as a first packet processing pipeline circuit 408 and a second packet processing pipeline circuit 425. The packet processing pipeline circuits can implement the data plane of the networking device. The pipeline circuits can execute P4 programs provided by the control plane. For example, the control plane may store the P4 programs into the memory used by the packet processing pipeline circuits to thereby configure the data plane. The P4 programs can include software code that configures the functionality of the data plane to implement processing and/or forwarding logic and to implement processing and/or forwarding tables that are populated and managed via P4 table management information that may be provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane. The data plane corresponds to a class of algorithms that describe transformations on packets by packet processing systems.

The first packet processing pipeline circuit 408 can include a pipeline ingress circuit 413, a parser circuit 412, match-action pipeline 411, a deparser circuit 410, and a pipeline egress circuit 409. The second packet processing pipeline circuit 425 can include a packet header vector (PHV) ingress circuit 428, a match-action pipeline 434, and a direct memory access (DMA) output circuit 426. The service processing offloads 417 are circuits implementing functions that the semiconductor chip uses so often that the designer has chosen to provide hardware for offloading those functions from the CPUs. The service processing offloads can include a compression circuit 418, decompression circuit 419, an encryption/decryption circuit 420, and a general use CRC calculation circuit 421. The compression circuit 418 may compress blocks of data in the off-chip memory 432 or the on-chip memory 416. The decompression circuit 419 may decompress blocks of data in the off-chip memory 432 or the on-chip memory 416. The encryption/decryption circuit 420 may encrypt and decrypt blocks of data in the off-chip memory 432 or the on-chip memory 416. The general use CRC calculation circuit 421 can calculate digest values of blocks of data in the off-chip memory 432 or the on-chip memory 416. For example, the general use CRC calculation circuit 421 can calculate Ethernet frame check sequence (FCS) values. The specific core circuits implemented within the non-limiting example of the semiconductor chip 401 can be selected such that the semiconductor chip implements many, perhaps all, of the functionality of an InfiniBand channel adapter, of a non-volatile memory express (NVMe) card, and of a networking device that processes network flows carried by internet protocol (IP) packets.

The first packet processing pipeline circuit 408 may be a specialized set of elements for processing network packets. The parser circuit 412 can parse a network packet to produce a packet header vector (PHV). Other elements of the networking device 430 may also produce a PHV. The first packet processing pipeline circuit 408 includes elements for processing the PHVs. The PHVs can include PHVs for network packets such as internet protocol (IP) packets and InfiniBand protocol data units (PDUs). The first packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The second packet processing pipeline circuit 425 may be a specialized set of elements for processing PHVs including PHVs for network packets such as internet protocol (IP) packets and InfiniBand PDUs. The second packet processing pipeline circuit 425 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store objects 112, kind summaries such as a first kind summary 441, the executable code and data of a kind updater 442, and the executable code and data of an object compiler 443. The objects 112 can include first kind objects 113, second kind objects 114, third kind objects 115, and fourth kind objects 116. The objects 112 can be different kinds of networking rules. For example, the first kind objects 113 can be routing rules, the second kind objects 114 can be firewall rules, the third kind objects 115 can be network address translation (NAT) rules, and the fourth kind objects 116 can be packet encapsulation rules.

The CPU cores 405, 406, 407 can be general purpose processor cores such as complex instruction set (CISC) processor cores or reduced instruction set (RISC) processor cores. Advanced RISC machine (ARM) processor cores are examples of RISC processor cores. X86 processor cores are generally considered to be examples of CISC processor cores. Each CPU core can include an arithmetic logic unit (ALU), a register bank, an instruction fetch unit, and an instruction decoder, which are configured to execute instructions independently of the other CPU cores. The CPU cores may be programmable using a general-purpose programming language such as C. The CPU 403 can also include a bus interface, internal memory, and a memory management unit (MMU) and/or memory protection unit. For example, the CPU cores may include internal cache, e.g., level 1 cache and/or level 2 cache, and/or may have access to nearby level 2 and/or level 3 cache. Each CPU core may include core-specific level 1 cache, including instruction-cache and data-cache and level 2 cache that may be specific to each CPU core or shared amongst a small number of CPU cores. Level 3 cache may also be available to the CPU cores.

The CPU cores may be available for control plane functions and for implementing aspects of a slow data path that includes software implemented packet processing functions. The CPU cores may be used to implement discrete packet processing operations such as layer 7 applications (e.g., HTTP load balancing, layer 7 firewalling, and/or layer 7 telemetry), certain InfiniBand channel adapter functions, flow table insertion or table management events, connection setup/management, multicast group join, deep packet inspection (DPI) such as uniform resource locator (URL) inspection, storage volume management such as non-volatile memory express (NVMe) volume setup and/or management, encryption, decryption, compression, and decompression, which may not be readily implementable through a domain-specific language such as P4, in a manner that provides fast path performance as may be expected of data plane processing.

The packet buffer 422 can act as a central on-chip packet switch that delivers packets from the network interfaces 433 to packet processing elements. The packet processing elements can include a slow data path implemented in software and a fast data path implemented by a packet processing pipeline circuit 408.

All data transactions in the semiconductor chip 401, including on-chip memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. Several vendors provide NOC IP cores. The NOC may provide cache coherent interconnect between the NOC masters, including the first packet processing pipeline circuit 408, the second packet processing pipeline circuit 425, CPU 403, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
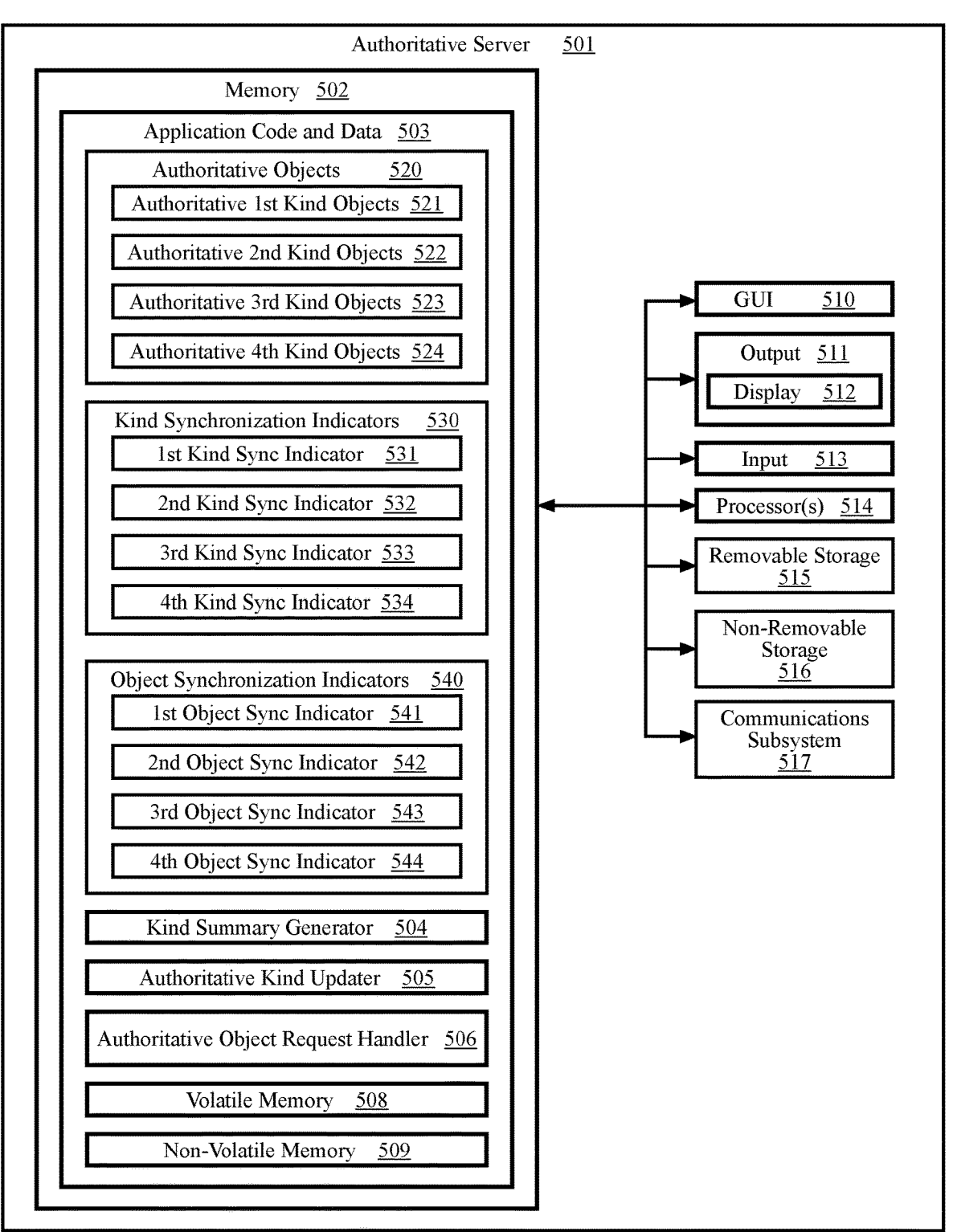
FIG. 5 is a high level block diagram illustrating an authoritative server configured to implement fast object synchronization with a networking device, according to some aspects.

FIG. 5 is a high level block diagram illustrating an authoritative server 501 configured to implement fast object synchronization with a networking device, according to some aspects. An authoritative server 501 in the form of a computer can be configured to interface with controllers, peripheral devices, and other elements may include one or more processors 514, memory 502, removable storage 515, and non-removable storage 516. The one or more processors can be RISC or CISC processors that are communicatively coupled to the memory 502 and other hardware elements of the authoritative server 501. Memory 502 may include volatile memory 508 and non-volatile memory 509. The authoritative server 501 may include or have access to a computing environment that includes a variety of transitory and non-transitory computer-readable media such as volatile memory 508 and non-volatile memory 509, removable storage 515 and non-removable storage 516. Computer storage may be computer readable medium such as random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

The authoritative server 501 may include, or have access to, a computing environment that includes input 513, output 511, and a communications subsystem 517. The authoritative server 501 may operate in a networked environment using a communications subsystem 517 to connect to one or more remote computers, remote sensors and/or controllers, detection devices, hand-held devices, multi-function devices, speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 511 may be provided as a computer monitor or display 512, but may be or include any output device. Output 511 and/or input 513 may include a data collection apparatus associated with the authoritative server 501. In addition, input 513, which commonly includes a computer keyboard and/or pointing device such as a computer mouse, computer trackpad, touch screen, or the like, allows a user to select and instruct the authoritative server 501. A user interface can be provided using output 511 and input 513. Output 511 may include a display 512 for displaying data and information for a user, or for interactively displaying a graphical user interface (GUI) 510. A GUI may be responsive to user inputs entered through input 513 and typically displays images and data on display 512. Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 513 such as, for example, a pointing device such as a mouse, and/or with a keyboard. A particular item can function in the same manner to the user in all applications because the GUI provides standard software routines to handle these elements and report the user's actions.

Computer-readable instructions, also called computer code or application code, can include or be representative of software routines, software subroutines, software objects, etc. Application data can be data used by or produced by the execution of computer readable instructions. Application code and data 503 can be stored on a computer-readable medium for use by or execution by the processor 514 of the authoritative server 501. The application code and data 503 can include authoritative objects 520, kind synchronization indicators 530, object synchronization indicators 540, a kind summary generator 504, an authoritative kind updater 505, and an authoritative request handler 506. The authoritative objects 520 can include authoritative first kind objects 521, authoritative second kind objects 522, authoritative third kind objects 523, and authoritative fourth kind objects 524. An authoritative first kind object 521 is a first kind of authoritative object. An authoritative second kind object 522 is a second kind of authoritative object. An authoritative third kind object 523 is a third kind of authoritative object. An authoritative fourth kind object 524 is a fourth kind of authoritative object.

The kind synchronization indicators 530 can include a first kind synchronization indicator 531 that can indicate the objects stored by a networking device are synchronized with the authoritative first kind objects 521. The kind synchronization indicators 530 can include a second kind synchronization indicator 532 that can indicate the objects stored by a networking device are synchronized with the authoritative second kind objects 522. The kind synchronization indicators 530 can include a third kind synchronization indicator 533 that can indicate the objects stored by a networking device are synchronized with the authoritative third kind objects 523. The kind synchronization indicators 530 can include a fourth kind synchronization indicator 534 that can indicate the objects stored by a networking device are synchronized with the authoritative fourth kind objects 524. The objects 112 stored by the networking device are synchronized with the authoritative first kind objects 521 while the first kind objects 113 are synchronized with the authoritative first kind objects 521. The objects 112 stored by the networking device are synchronized with the authoritative second kind objects 522 while the second kind objects 114 are synchronized with the authoritative second kind objects 522. The objects 112 stored by the networking device are synchronized with the authoritative third kind objects 523 while the third kind objects 115 are synchronized with the authoritative third kind objects 523. The objects 112 stored by the networking device are synchronized with the authoritative fourth kind objects 524 while the fourth kind objects 116 are synchronized with the authoritative fourth kind objects 524.

Each of the object synchronization indicators 540 may indicate that an object stored by the networking device is synchronized with the authoritative objects or that an object stored by the networking device is out of sync (not synchronized) with the authoritative objects. For example, a first object synchronization indicator 541 can indicate that a first one of the first kind objects 113 is synchronized with the authoritative objects, a second object synchronization indicator 542 can indicate that a second one of the first kind objects 113 is out of sync with the authoritative objects, a third object synchronization indicator 543 can indicate that a third one of the first kind objects 113 is synchronized with the authoritative objects, and a fourth object synchronization indicator 544 can indicate that a fourth one of the first kind objects 113 is out of sync with the authoritative objects.

The kind summary generator 504 can produce a kind summary for one of the kinds of authoritative object. For example, the kind summary generator can produce a first kind summary by producing object summaries for all the authoritative first kind objects 521 and by including those object summaries in the first kind summary.

Figure 6:
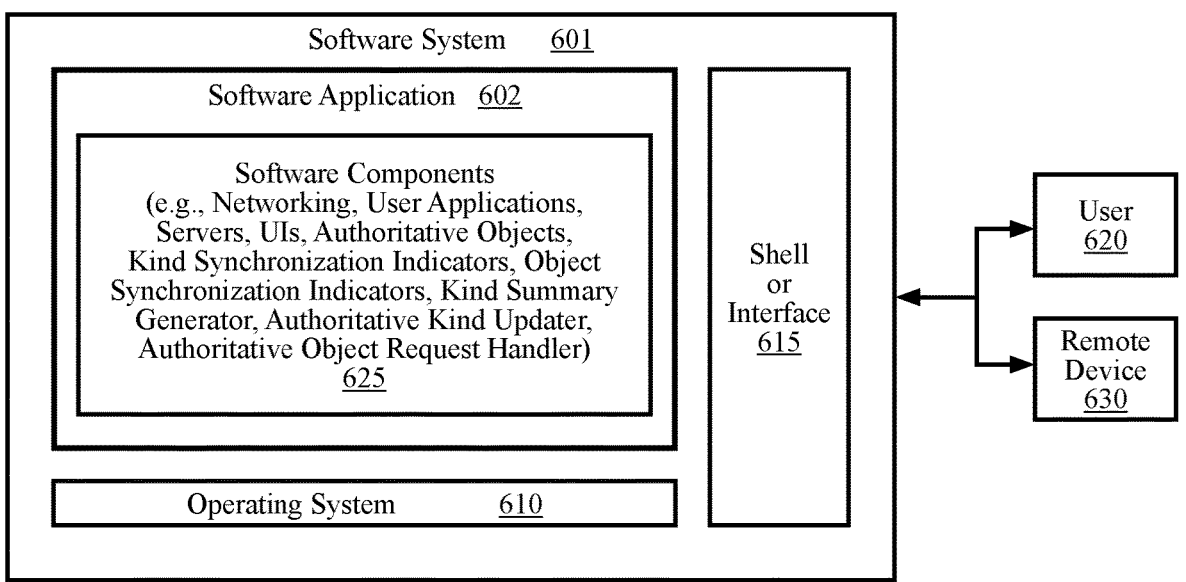
FIG. 6 a high level block diagram illustrating a software system that can be configured to implement fast object synchronization with a networking device, according to some aspects.

FIG. 6 a high level block diagram illustrating a software system 601 that can be configured to implement fast object synchronization with a networking device, according to some aspects. A software application 602 having software components 625, may be stored in memory 502, on removable storage 515, or on non-removable storage 516, and generally includes and/or may be associated with a kernel or operating system 610 and a shell or interface 615. One or more application programs may be "loaded" (i.e., transferred from removable storage 515 or non-removable storage 516 into the memory 502) for execution by the authoritative server 501. A software application 602 can include software components 625 and data such as software modules, software subroutines, software objects, networking code, user application code, server code, user interface code, authoritative objects, kind synchronization indicators, object synchronization indicators, kind summary generator code, authoritative kind updater code, and authoritative object request handler code. The authoritative server 501 can receive user commands and data through interface 615, which can include input 513, output 511, and communications connection 517 accessible by a user 620 or remote device 630. These inputs may then be acted upon by the authoritative server 501 in accordance with instructions from operating system 610 and/or software application 602 and any software components 625 thereof.

Generally, software components 625 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component," "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines, and an implementation, which may be private (accessible only from within the application or component) and which includes source code that implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 615 can include a graphical user interface 510 that can display results, whereupon a user 620 or remote device 630 may supply additional inputs or terminate a particular session. In some embodiments, operating system 610 and GUI 510 can be implemented in the context of a "windows" system. It can be appreciated, of course, that other types of systems are possible. For example, rather than a traditional windows system, other operating systems such as, for example, a real-time operating system (RTOS) more commonly employed in wireless systems may also be employed with respect to operating system 610 and interface 615. The software application 602 can include, for example, software components 625, which can include instructions for carrying out steps or logical operations such as those shown and described herein.

The description herein is presented with respect to embodiments that can be embodied in the context of, or require the use of, a data-processing system such as authoritative server 501, in conjunction with program code in an application code and data 503 in memory 502, software system 601, or authoritative server 501. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

FIG. 7 a high level block diagram illustrating metadata 130 sent to and received by devices implementing fast object synchronization, according to some aspects. The metadata 130 can include a kind synchronization request 120, kind synchronization indicators 121, a kind summary request 705, a first kind summary 706, an authoritative object request 124, an authoritative object response 125, and an object synchronization confirmation 720. A networking device 111 can send a kind sync request 120 to an authoritative server 101. In response to receiving the kind sync request 120, the authoritative server 101 can send kind sync indicators 121 to the networking device 111. The kind sync indicators 121 can include a first kind sync indicator 701, a second kind sync indicator 702, a third kind sync indicator 703, and a fourth kind sync indicator 704. The first kind sync indicator 701 is illustrated as having a value (e.g., "False") that indicates that the objects of the first kind stored by the networking device 111 are not synchronized with the authoritative objects stored by the authoritative server 101. The second kind sync indicator 702 is illustrated as having a value (e.g., "True") that indicates that the objects of the second kind stored by the networking device 111 are synchronized with the authoritative objects stored by the authoritative server 101. The third kind sync indicator 703 is illustrated as having a value (e.g., "True") that indicates that the objects of the third kind stored by the networking device 111 are synchronized with the authoritative objects stored by the authoritative server 101. The fourth kind sync indicator 704 is illustrated as having a value (e.g., "True") that indicates that the objects of the fourth kind stored by the networking device 111 are synchronized with the authoritative objects stored by the authoritative server 101. As such, the objects stored by the networking device can be synchronized with the authoritative objects by synchronizing only the first kind of objects.

The networking device 111 can begin synchronizing the first kind objects by sending a first kind summary request 705 to the authoritative server 101. In response to receiving the first kind summary request 705, the authoritative server 101 can send a first kind summary 706 to the networking device 111. The first kind summary 706 can include one or more object summaries such as a first object summary 707, a second object summary 711, and a last object summary 712. An object summary can include information about an authoritative object such that the networking device 111 can determine whether the locally stored objects include an object that is synchronized with the authoritative object. As such, an object summary can include an object name 708, a unique identifier 709, a version indicator 710, and a kind indicator 721. Upon creation, an authoritative object can have an object name 708, a unique identifier 709, a version indicator 710, and a kind indicator 721. The object name and the unique identifier can remain the same from object creation time to object deletion time. After deletion, a new object having the same name may be created, but the new object, being different from the earlier object of that name, has a different unique identifier. The version indicator may change each time the object is changed. The kind indicator can indicate what kind of object the authoritative object is.

The networking device can use the object summaries in the first kind summary 706 to determine which authoritative objects are needed for synchronizing the locally stored first kind objects with the authoritative objects. The networking device's locally stored objects are the objects stored in the memory of the networking device. The networking device 111 can request one or more authoritative objects by sending an authoritative object request 124 to the authoritative server 101. The authoritative object request 124 can include object summaries, a list of unique identifiers, or some other data that indicates which authoritative objects are being requested. In response to receiving the authoritative object request 124, the authoritative server 101 can send an authoritative object response 125 to the networking device 111. The authoritative object response 125 can include the authoritative objects requested via the authoritative object request 124. For example, the authoritative object response 125 can include a first authoritative object 717, a second authoritative object 718, and a last authoritative object 719. The networking device 111 can send an object synchronization confirmation 720 to the authoritative server 101 to thereby indicate that one or more of the locally stored objects are synchronized with authoritative objects. The object sync confirmation 720 can include object summaries, a list of unique identifiers, or some other data that indicates which authoritative objects have been synchronized with the objects stored by the networking device 111.

Figure 8:
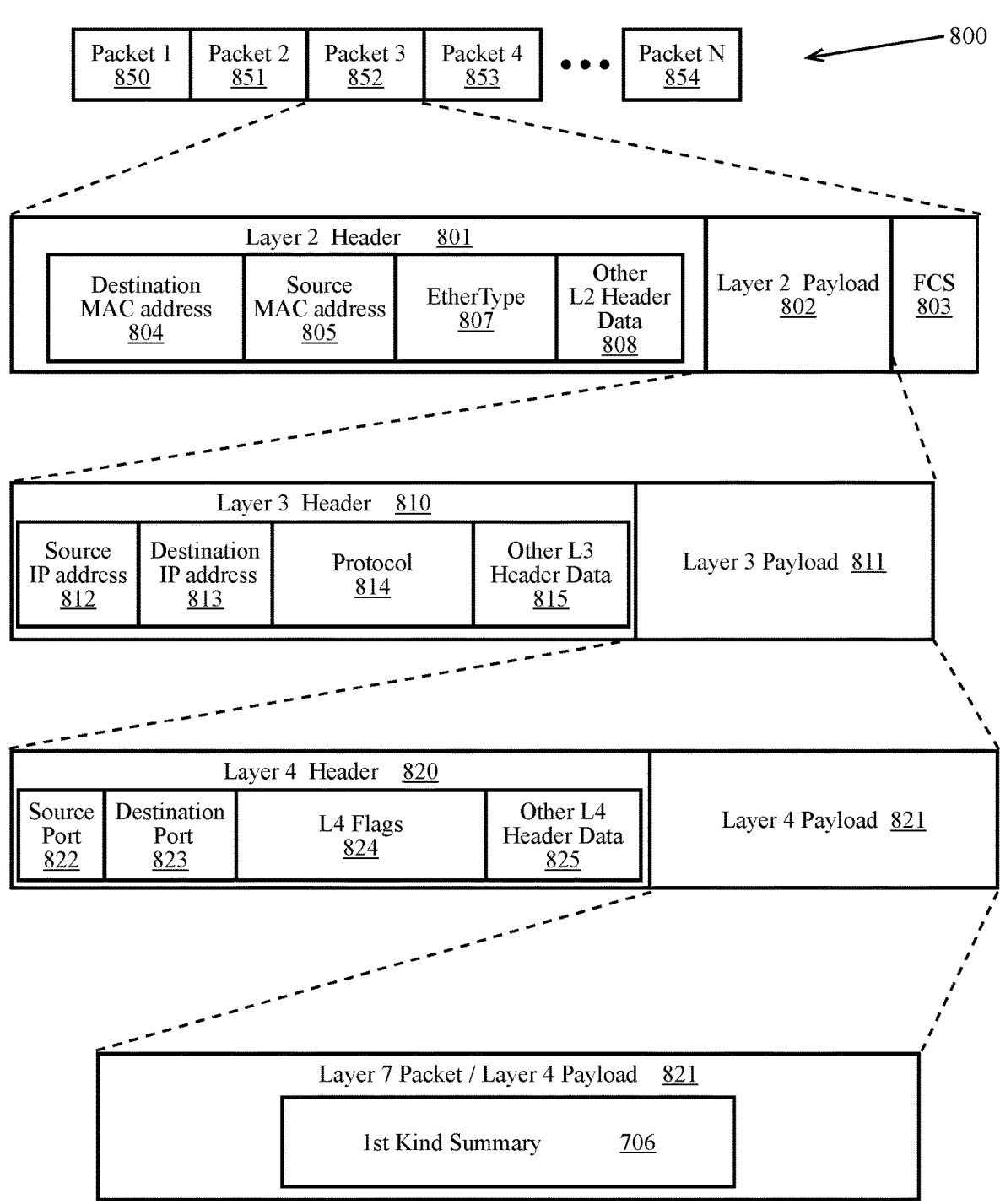
FIG. 8 illustrates packet headers and payloads of packets of network traffic flows that can carry requests and responses sent to and received by devices implementing fast object synchronization, according to some aspects.

FIG. 8 illustrates packet headers and payloads of packets of network traffic flows that can carry requests and responses sent to and received by devices implementing fast object synchronization, according to some aspects. A network flow can be a group of network packets passing from one specific endpoint to another specific endpoint. A network flow 800 can have numerous network packets such as a first packet 850, a second packet 851, a third packet 852, a fourth packet 853, and a last packet 854 with many more packets between the fourth packet 853 and the last packet 854. The term "the packet" or "a packet" may refer to any of the network packets in a network flow.

Packets can be constructed and interpreted in accordance with the Internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by an ingress port as a raw bit stream or transmitted by an egress port as a raw bit stream.

The link layer is often called layer 2. The protocols of the link layer operate within the scope of the local network connection to which a host is attached and includes all hosts accessible without traversing a router. The link layer may be used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a destination MAC address 804, a source MAC address 805, an ethertype 807, and other layer 2 header data 808. The ingress ports and egress ports of a networking device can have MAC addresses. A networking device can have a MAC address that may be applied to all or some of the ports. Alternatively, a networking device may have one or more ports that each have their own MAC address. In general, each port can send and receive packets. Ethernet, also known as Institute of Electrical and Electronics Engineers (IEEE) 802.3, is a layer 2 protocol. IEEE 802.11 (WIFI) is another widely used layer 2 protocol. The layer 2 payload 802 can include a layer 3 packet. The layer 2 FCS 803 can include a cyclic redundancy check (CRC) calculated from the layer 2 header and layer 2 payload. The layer 2 FCS can be used to verify that the packet has been received without errors.

The internet layer, often called layer 3, is the layer where layer 3 packets may be routed from a first node to a second node across multiple intermediate nodes. The nodes may be networking devices such as networking device 201. Internet protocol (IP) is a commonly used layer 3 protocol specified in requests for comment (RFCs) published by the Internet Engineering Task Force (IETF). More specifically, the format and fields of IP packets are specified by IETF RFC 791. The layer 3 packet (an IP packet is shown) may have a layer 3 header 810 and a layer 3 payload 811. An IP header may be the layer 3 header of an IP packet and the layer 3 payload of an IP packet may be referred to as an IP payload. The layer 3 header 810 may have a source IP address 812, a destination IP address 813, a protocol indicator 814, and other layer 3 header data 815. A packet may be directed from a source machine at the source IP address 812 and may be directed to the destination machine at the destination IP address 813. As an example, a first node may send an IP packet to a second node via an intermediate node. The IP packet therefore has a source IP address indicating the first node and a destination IP address indicating the second node. The first node may make a routing decision to send the IP packet to the intermediate node. The first node may therefore send the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node may make a routing decision to send the IP packet to the second node. The intermediate node may then send the IP packet to the second node in a second layer 2 packet having a source MAC address 804 indicating the intermediate node, a destination MAC address 805 indicating the second node, and the IP packet as a payload. The layer 3 payload 811 may include headers and payloads for higher layers in accordance with higher layer protocols such as transport layer protocols.

The transport layer, often called layer 4, may establish basic data channels that applications use for task-specific data exchange and may establish host-to-host connectivity. A layer 4 protocol may be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP may be referred to as TCP/IP. TCP may provide reliable, ordered, and error-checked delivery of a stream of bytes between applications running on hosts communicating via an IP network. When carrying TCP data, a layer 3 payload 811 includes a TCP header and a TCP payload. UDP may provide for computer applications to send messages, in this case referred to as datagrams, to other hosts on an IP network using a connectionless model. When carrying UDP data, a layer 3 payload 811 includes a UDP header and a UDP payload. ICMP may be used by network devices, including routers, to send error messages and operational information indicating success or failure when communicating with another IP address. ICMP uses a connectionless model.

A layer 4 packet (a TCP packet is shown) may have a layer 4 header 820 (a TCP header is shown) and a layer 4 payload 821 (a TCP payload is shown). The layer 4 header 820 may include a source port 822, destination port 823, layer 4 flags 824, and other layer 4 header data 825. The source port and the destination port may be integer values used by host computers to deliver packets to application programs configured to listen to and send on those ports. The layer 4 flags 824 may indicate a status of or action for a network flow. A layer 4 payload 821 may contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols may be encapsulated into transport layer protocol data units (such as TCP or UDP messages), which in turn use lower layer protocols to effect actual data transfer. In FIG. 8, a first kind summary 706 is illustrated as the layer 7 packet/layer 4 payload 821. An example of a first kind summary 706 is illustrated in FIG. 7.

Figure 9:
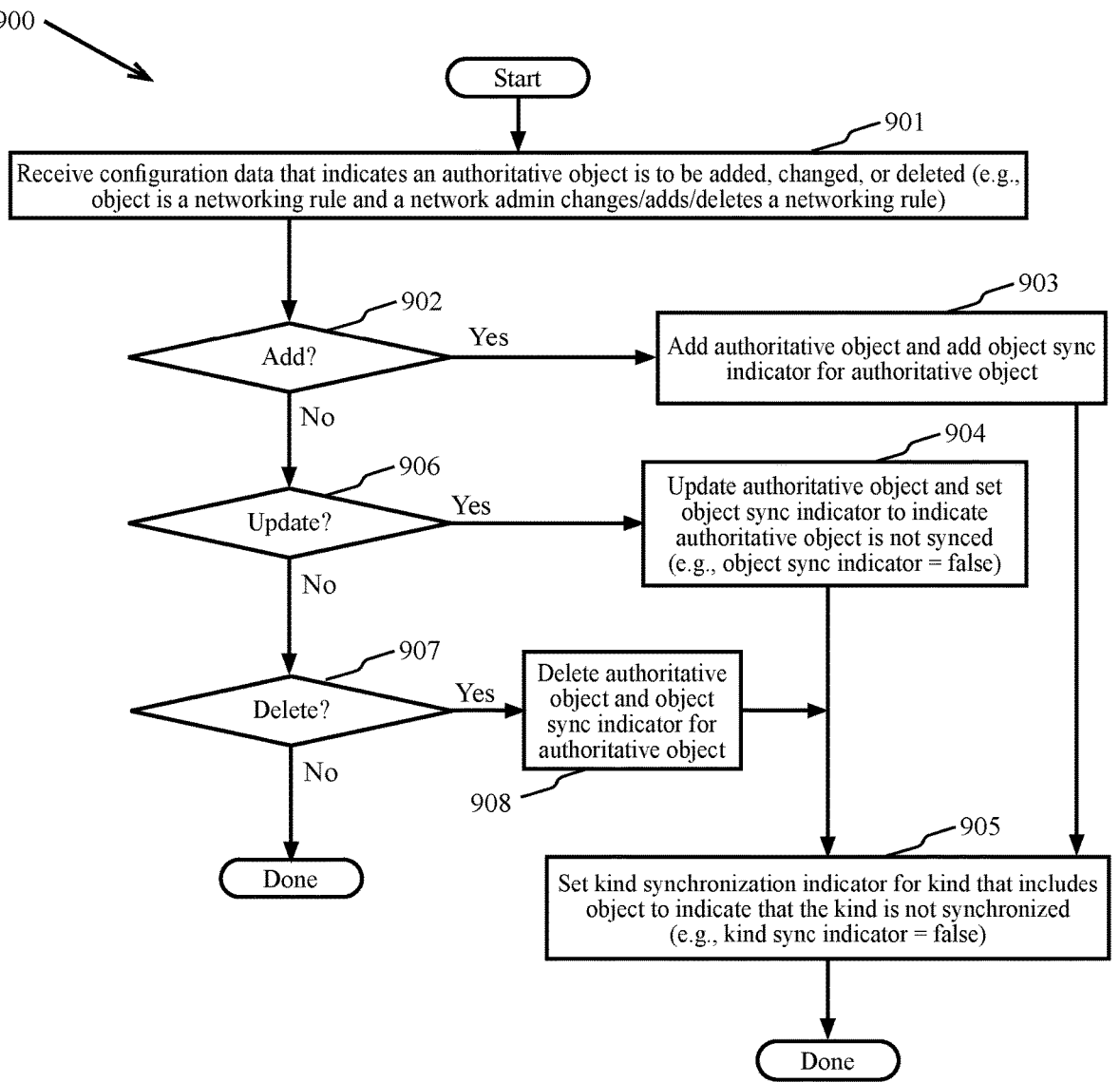
FIG. 9 is a high-level flow diagram illustrating a process for updating object sync indicators and kind sync indicators in response to an object being added, changed, or deleted, according to some aspects.

FIG. 9 is a high-level flow diagram illustrating a process 900 for updating object sync indicators and kind sync indicators in response to an object being added, changed, or deleted, according to some aspects. This process may be implemented by the authoritative server. After the start, at block 901 the process can receive configuration data that indicates an authoritative object to be added, changed, or deleted. For example, the object can be a networking rule and an authoritative object is added, changed, or deleted when a network admin changes, adds, or deletes a networking rule. At decision block 902, the process can determine whether an authoritative object is to be added. The process moves from decision block 902 to block 903 if an authoritative object is to be added and otherwise moves to decision block 906. At block 903, the process can store the new authoritative object and may add an authoritative object sync indicator for the newly added authoritative object. The authoritative object sync indicator indicates that the objects stored by a networking device are not synchronized with the new authoritative object. At decision block 906, the process can determine whether an authoritative object is to be updated. The process moves from decision block 906 to block 904 if an authoritative object is to be updated and otherwise moves to decision block 907. At block 904, the process can update the authoritative object and set an object sync indicator for the authoritative object to indicate that the objects stored by a networking device are not synchronized with the authoritative object. At decision block 907, the process can determine whether an authoritative object is to be deleted. The process moves from decision block 907 to block 908 if an authoritative object is to be deleted and otherwise the process is done. At block 908, the process can delete the authoritative object and the object sync indicator for the authoritative object. At block 905, the process can set, or produce, the kind synchronization indicator for the kind that includes the authoritative object to indicate that the kind is not synchronized between the networking device and the authoritative server. For example, a kind sync indicator having the value "false" or "0" can indicate that the kind is not synchronized between the networking device and the authoritative server.

FIG. 10 is a high-level flow diagram illustrating a process 1000 for producing a kind summary in response to a kind summary request, according to some aspects. This process may be implemented by the authoritative server. A kind summary can include object summaries for all the authoritative objects of a certain kind. After the start, at block 1001 the process can receive a kind summary request for a kind of object. The kind summary request can include a kind indicator that indicates which of the kinds is the requested kind. At block 1002, a kind summary may be initialized. At this point, the kind summary may contain no object summaries. At block 1003, the current object may be set to the first object of the requested kind. At block 1004, an object summary of the current object may be produced. An object summary 707 does not include all the information that the object includes. For example, the object summary for an object may contain only three values, specifically the object's name, the object's unique identifier, and the object's version number. The object summary may contain a fourth value such as the object's kind. At block 1005, the object summary for the current object may be added to the kind summary. At decision block 1006, the process can determine whether the current object is the last object of the requested kind. The process moves to block 1008 if the current object is the last object of the requested kind at decision block 1006 and otherwise moves to block 1007. At block 1007, the process sets current object to the next object of the requested kind and then loops back to block 1004. At block 1008, the process sends the kind summary in response to the kind summary request. For example, a networking device can send the kind summary request to an authoritative server and the authoritative server can send the kind summary to the networking device in response to the kind summary request.

FIG. 11 is a high-level flow diagram illustrating a process 1100 for comparing compares a kind summary to locally stored objects and produces an object request, according to some aspects. This process may be implemented by the networking device. This process can transform a kind summary into an authoritative object request. After the start, at block 1101 the process can receive a kind summary for a kind of object. An object can be a specified kind of object. For example, the object can have or be of a specified kind. For example, the object can be a first kind of object, a second kind of object, etc. The object may be in a list or table of objects of the specified kind (e.g., a table of firewall rules, a table of routing rules, etc.). An object may be associated with, include, or in some other manner have metadata that includes a kind indicator that specifies the kind of the object. A list of objects, table of objects, or other data structure including objects of a certain kind may be associated with, include, or in some other manner have metadata that includes a kind indicator that specifies the kind of objects. At block 1102 the process can delete locally stored objects of the specified kind that have no matching object summary in the kind summary. An object and an object summary that have the same object name are matching. At block 1103 the process can delete object summaries from the kind summary that have matching locally stored objects of the specified kind that have the same version number and the same unique identifier (UID). At block 1104, previous steps have pruned the kind summary to form the authoritative object request and the process can send the authoritative object request to the authoritative server.

Figure 12:
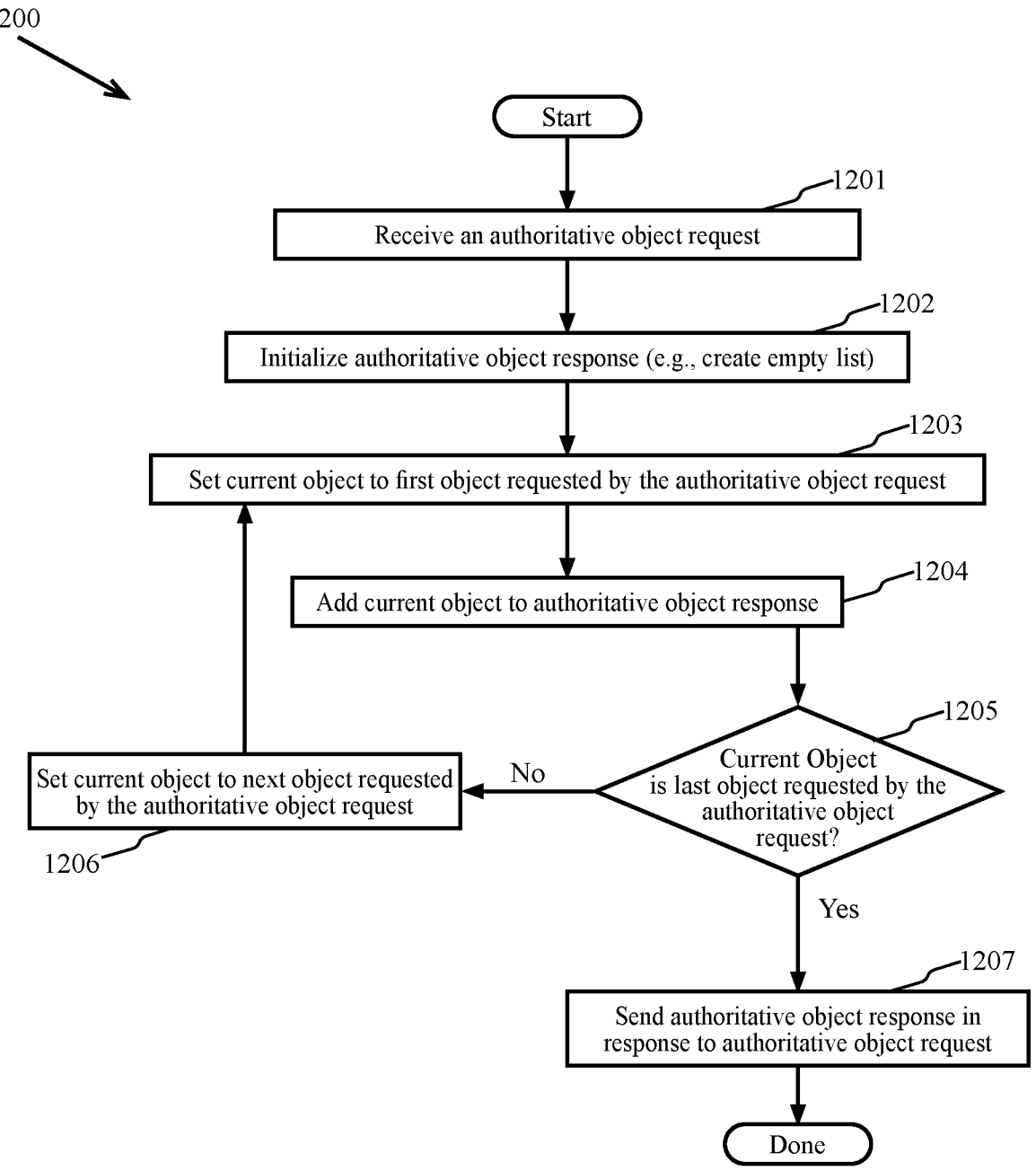
FIG. 12 is a high-level flow diagram illustrating a process for sending sends authoritative objects in response to an authoritative object request, according to some aspects.

FIG. 12 is a high-level flow diagram illustrating a process 1200 for sending authoritative objects in response to an authoritative object request, according to some aspects. This process may be implemented by the authoritative server. After the start, at block 1201 the process can receive an authoritative object request. At block 1202 the process can initialize an authoritative object response by, for example, creating an empty list. At block 1203 the process can set current object to the first object requested by the authoritative object request. At block 1204 the process can add the current object to the authoritative object response. At decision block 1205, the process can determine whether the current object is the last object requested by the authoritative object request. The process can move to block 1207 if the current object is the last object requested by the authoritative object request, otherwise the process can move to block 1206. At block 1206 the process can set the current object to the next object requested by the authoritative object request before the process loops back to block 1203. At block 1207 the process can send the authoritative object response in response to receiving the authoritative object request.

Figure 13:
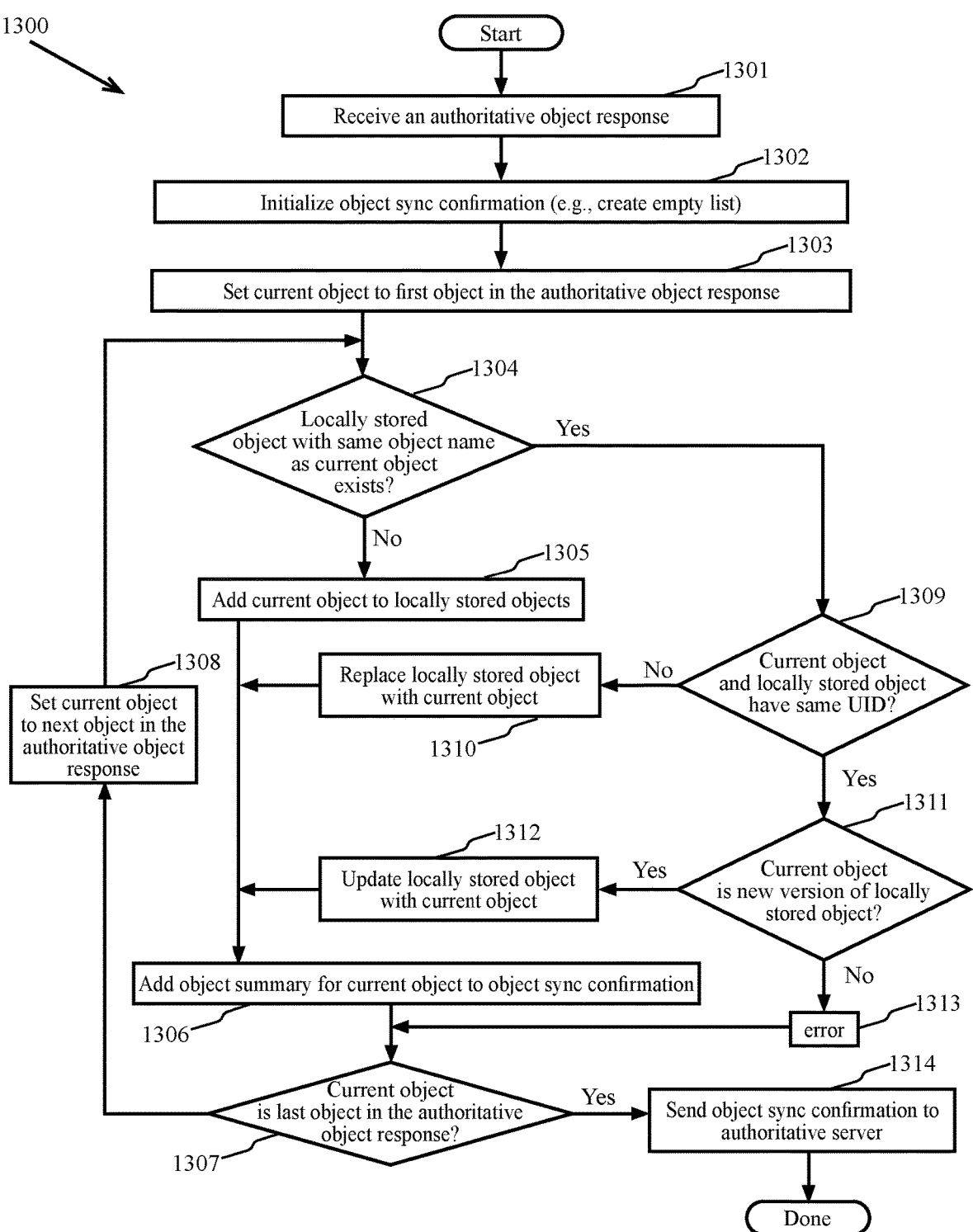
FIG. 13 is a high-level flow diagram illustrating a process for using authoritative objects to add, update, and replace locally stored objects, according to some aspects.

FIG. 13 is a high-level flow diagram illustrating a process 1300 for using authoritative objects to add, update, and replace locally stored objects, according to some aspects. This process may be implemented by the networking device. This process may also prepare an object sync confirmation. After the start, at block 1301 the process can receive an authoritative object response. At block 1302 the process can initialize the object sync confirmation by, for example, creating an empty list. At block 1303 the process can set the current object to the first object in the authoritative object response. At decision block 1304, the process can determine whether a locally stored object with the same object name as the current object exists. The process can move to decision block 1309 if an object with the same object name as the current object exists, otherwise the process can move to block 1305. At block 1305 the process can add the current object to locally stored objects. At block 1306 the process can add an object summary for the current object to the object sync confirmation. At decision block 1307, the process can determine whether the current object is the last object in the authoritative object response. The process can move to block 1314 if the current object is the last object in the authoritative object response, otherwise the process can move to block 1308. At block 1308 the process can set current object to the next object in the authoritative object response before looping back to decision block 1304. At block 1314 the process can send the object sync confirmation to the authoritative server.

At decision block 1309, the process can determine whether the UID of the current object and the UID of the locally stored object are equal. The process can move to decision block 1311 if the current object and the locally stored object have the same UID, otherwise the process can move to block 1310. At block 1310 the process can replace the locally stored object with the current object. For example, the locally stored object can be deleted and the current object can be added to the locally stored objects. An object may be replaced in response to determining that an authoritative object has the same name (at decision block 1304) and a different UID (at decision block 1309) because the different UID indicates that an authoritative object with the same name was deleted and a new authoritative object with the same name was added. At decision block 1311, the process can determine whether the current object may be a new version of a locally stored object. For example, the current object may be a new version when the version number of the current object is higher than the version number of the locally stored object. The process can move to block 1312 if the current object is a new version of the locally stored object, otherwise the process can move to block 1313. At block 1312 the process can update the locally stored object with the current object. For example, the values of some of the fields (e.g., version number, etc.) of the current object can be copied into the corresponding fields of the locally stored object. In this manner, other data (e.g., usage metrics) that may be stored in the locally stored object can be retained when the locally stored object is updated. The locally stored object may be updated in response to determining that the object name of locally stored object matches the object name of the current object (at decision block 1304), that the UID of the locally stored object equals the UID of the current object (at decision block 1309), and that the version indicator of the locally stored object does not equal the version indicator of the current object (at decision block 1311). Reaching block 1313 indicates an error has occurred, as such the process may report an error at block 1313.

FIG. 14 is a high-level flow diagram illustrating a process 1400 for using an authoritative object synchronization confirmation to update object synchronization indicators and kind sync indicators, according to some aspects. This process may be implemented by the authoritative server. After the start, at block 1401 the process can receive an object sync confirmation for objects of a specified kind. At block 1402 the process can set current object to the first object in the object sync confirmation. At block 1403 the process can set the object sync indicator for the current object to indicate the current object is synced with the networking device. At decision block 1404, the process can determine whether the current object is the last object in object sync confirmation. The process can move to block 1406 if the current object is the last object in object sync confirmation, otherwise the process can move to block 1405. At block 1405 the process can set the current object to the next object requested by the authoritative object request before the process loops back to block 1403. The "current object" variable may now be used to step through all the objects of the specified kind to determine if the entire kind is synchronized with the networking device.

At block 1406 the process can set current object to the first authoritative object of specified kind. At decision block 1407, the process can determine whether the current object is synced with the networking device. The process can move to decision block 1409 if the current object is synced with the networking device, otherwise the process can move to block 1408. At block 1408 the process can set the kind sync indicator for specified kind to indicate the specified kind is not synced with the networking device, and then the process completes. At decision block 1409, the process can determine whether the current object is the last object of specified kind. The process can move to block 1411 if the current object is the last object of specified kind, otherwise the process can move to block 1410. At block 1410 the process can set current object to the next authoritative object of specified kind and then loops back to decision block 1407. At block 1411 the process can set the kind sync indicator for the specified kind to indicate the specified kind is synced with the networking device, and then the process completes.

Figure 15:
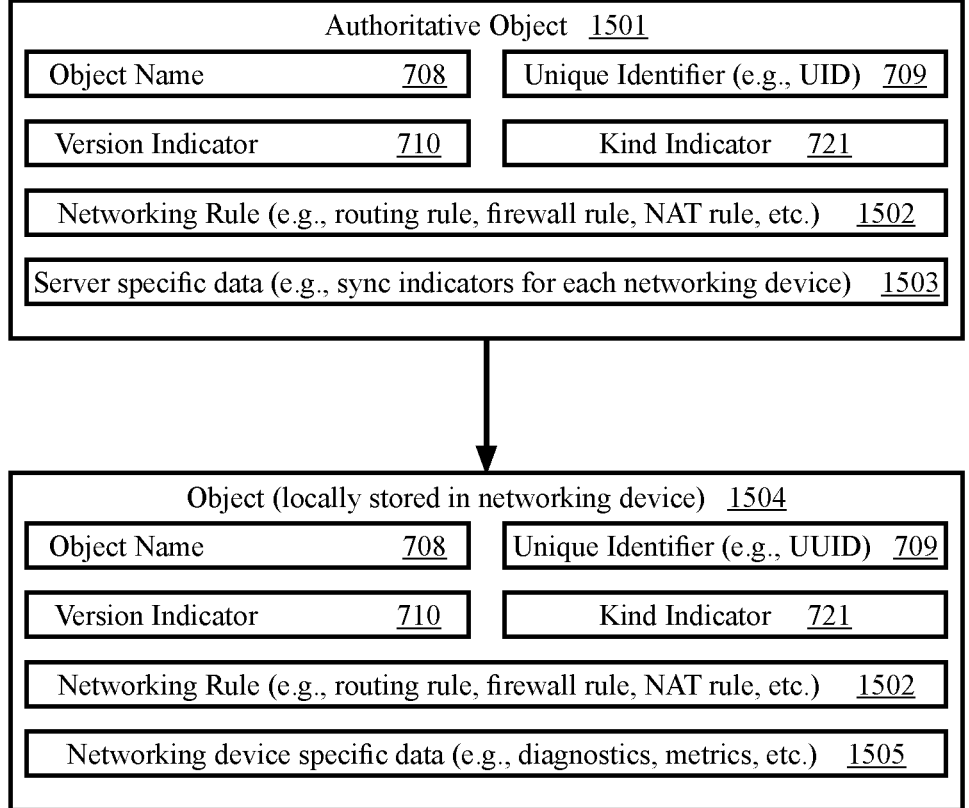
FIG. 15 is a high-level conceptual diagram illustrating an example of an authoritative object of an authoritative server and an example of an object that may be locally stored by a networking device, according to some aspects.

FIG. 15 is a high-level conceptual diagram illustrating an example of an authoritative object 1501 of an authoritative server and an example of an object 1504 that may be locally stored by a networking device, according to some aspects. The authoritative object 1501 can include an object name 708, a unique identifier 709, a version indicator 710, a kind indicator 721, a networking rule 1502, and server specific data 1503. The object 1504 can include an object name 708, a unique identifier 709, a version indicator 710, a kind indicator 721, the networking rule 1502, and networking device specific data 1505. The authoritative object 1501 may be stored by the authoritative server or by a database that the authoritative server accesses. The networking device can store object 1504 as a locally stored object by storing the object in the memory of the networking device. The object 1504 and the authoritative object can be considered synchronized with one another when they have the same object name 708, unique identifier 709, and version indicator 710. Objects such as the object 1504 and the authoritative object are synced when they are synchronized with one another. The server specific data 1503 can include synchronization indicators that indicate which networking devices are storing objects that are synced with the authoritative object 1501 and which networking devices are not storing objects that are synced with the authoritative object 1501. The server specific data 1503 can include data that indicates which networking devices may be storing an object that is synced with the authoritative object 1501. For example, the server specific data 1503 can include a table that lists the networking devices that may be storing an object that is synced with the authoritative object 1501. The table can include synchronization indicators for each of those networking devices that indicate the networking device is synced with the authoritative object 1501 (e.g., synchronization indicator=true) or that indicate the networking device is not synced with the authoritative object 1501 (e.g., synchronization indicator=false). The networking device specific data 1505 can include diagnostics or metrics that may be useful for analyzing network faults or the performance of the networking device. An authoritative object sent from the authoritative server to the networking device might not include the server specific data 1503.

FIG. 16 is a high-level flow diagram illustrating a method 1600 for fast object synchronization, according to some aspects. This process can be implemented by a networking device. After the start, at block 1601 the method can store, by a networking device, a plurality of objects that includes a plurality of first kind objects and a plurality of second kind objects. At block 1602 the method can request a first kind summary in response to receiving a first kind synchronization indicator that indicates the first kind objects are not synchronized. At block 1603 the method can delete a first one of the first kind objects in response to using the first kind summary to determine that the first one of the first kind objects is to be deleted. At block 1604 the method can replace a second one of the first kind objects in response to using the first kind summary to determine that the second one of the first kind objects is to be replaced. At block 1605 the method can determine, in response to receiving a second kind synchronization indicator, that the second kind objects are synchronized.

FIG. 17 is a high level flow diagram illustrating a process 1700 for sending a kind synchronization request upon startup or reconnecting to an authoritative server, according to some aspects. The process illustrated in FIG. 17 may be implemented by a networking device. The object synchronization techniques and process discussed above may be needed when the networking device restarts or reconnects to the authoritative server. While running and connected to the authoritative server, the networking device may receive updates from the authoritative server such that the objects stored by the networking device are synchronized with the authoritative objects. Such updates may not reach the networking device. For example, an update might not reach the networking device due to connection failure. Similarly, the networking device might not receive updates while powered down or while restarting. As such, the networking device sends a kind sync request 1701 after restart and after reconnecting to the authoritative server.

FIG. 18 is a high-level flow diagram illustrating another method 1800 for fast object synchronization, according to some aspects. This process can be implemented by a networking device. After the start, at block 1801 the method can store, by a networking device, a plurality of objects. At block 1802 the method can share metadata corresponding to the plurality of objects with an authoritative server that stores the plurality of authoritative objects. At block 1803 the method can determine which objects of the plurality of objects to update in response to sharing the metadata with the authoritative server. At block 1804 the method can update at least one object in the plurality of objects stored in the memory in response to determining that the at least one object is to be updated. At block 1805 the method can delete at least one other object in the plurality of objects stored in the memory in response to determining that the at least one other object is to be deleted. At block 1806 the method can determine, in response to receiving another kind synchronization indicator, that the first kind objects are synchronized and that no need exists for exchanging additional metadata to sync the first kind objects.

A further example illustrating some aspects is a system that includes an authoritative server and a networking device. The authoritative server can store authoritative objects and the networking device can store objects (e.g., non-authoritative objects) and can be operable to synchronize the objects with the authoritative objects. Synchronizing the objects with the authoritative objects includes can include sharing metadata corresponding to the objects with the authoritative server, determining which of the plurality of objects to update in response to sharing the metadata with the authoritative server, and updating at least one object that is in the objects stored in the networking device in response to determining that the at least one object is to be updated. Furthermore, the objects can include first kind objects, and sharing the metadata can include requesting a first kind summary in response to receiving a first kind synchronization indicator that indicates the first kind objects are not synchronized. Updating the at least one object can include replacing one of the first kind objects with one of the authoritative objects in response to using the first kind summary to determine that the one of the first kind objects is to be replaced. Synchronizing the objects with the authoritative objects may include deleting a second one of the first kind objects in response to using the first kind summary to determine that the second one of the first kind objects is to be deleted. Determining which of the objects to update may include determining, in response to receiving another first kind synchronization indicator, that the first kind objects are synchronized.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above may be implemented in processing circuits and memory that may be integrated into the same integrated circuit (IC) device as ASIC circuits and memory that are used to implement the programmable packet processing pipeline. For example, the CPU and other semiconductor chip circuits are fabricated on the same semiconductor substrate to form a System-on-Chip (SoC). The networking device may be implemented as a single IC device (e.g., fabricated on a single substrate) or the networking device may be implemented as a system that includes multiple IC devices connected by, for example, a printed circuit board (PCB). The interfaces may include network interfaces (e.g., Ethernet interfaces and/or Infini-Band interfaces) and/or PCIe interfaces. The interfaces may also include other management and control interfaces such as I2C, general purpose Ios, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It may also be noted that at least some of the operations for the methods described herein may be implemented using software instructions stored on a computer usable storage medium for execution by a computer. For example, a computer program product can include a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific examples have been described and illustrated, the scope of the claimed systems, methods, devices, etc. is not to be limited to the specific forms or arrangements of parts so described and illustrated. The scope may be defined by the claims appended hereto and their equivalents.

What is claimed is:

1. A system comprising:
a memory configured to store a plurality of objects that includes a plurality of first kind objects; and
a processor communicatively coupled to the memory, wherein the processor and the memory are configured to synchronize the plurality of objects with a plurality of authoritative objects, wherein synchronizing the plurality of objects with the plurality of authoritative objects includes:
requesting a first kind summary in response to receiving a first kind synchronization indicator that indicates the first kind objects are not synchronized with the authoritative objects;
updating a first one of the first kind objects in response to using the first kind summary to determine that the first one of the first kind objects is to be updated; and
determining that the first kind objects are synchronized with the authoritative objects in response to receiving another first kind synchronization indicator.

2. The system of claim 1, wherein:
updating the first one of the first kind objects includes replacing the first one of the first kind objects with one of the authoritative objects.

3. The system of claim 1 wherein:
the first kind summary includes a plurality of object summaries that each has an object name; and
a second one of the first kind objects is deleted in response to determining that the object name of the second one of the first kind objects does not match the object name of any of the object summaries.

4. The system of claim 1 wherein:
the first kind summary includes an object summary that includes an object name, and a unique identifier (UID); and
a second one of the first kind objects is replaced in response to determining that the object name of the second one of the first kind objects matches the object name of the object summary and that the UID of the second one of the first kind objects does not equal the UID of the object summary.

5. The system of claim 1 wherein the processor and the memory are further configured to:

request the first kind synchronization indicator by sending a kind synchronization request to an authoritative server.

6. The system of claim 1 wherein the processor and the memory are further configured to:

request the first kind summary from an authoritative server configured to produce the first kind summary from a plurality of authoritative first kind objects that are included in the authoritative objects.

7. The system of claim 1 wherein the processor and the memory are further configured to:

request an authoritative object in response to determining that the one of the first kind objects is to be replaced; and replace the one of the first kind objects with the authoritative object.

8. The system of claim 1 wherein the processor and the memory are further configured to:

request an authoritative first kind object that has an object name in response to determining that an object summary in the first kind summary has the object name and that none of the first kind objects have the object name; and add the authoritative first kind object to the first kind objects that are stored in the memory.

9. The system of claim 1 wherein:

the first kind summary includes an object summary that includes an object name, a unique identifier (UID), and a version indicator; and a second one of the first kind objects is updated in response to determining that the object name of the second one of the first kind objects matches the object name of the object summary, that the UID of the second one of the first kind objects is equal to the UID of the object summary, and that the version indicator of the second one of the first kind objects does not equal the version indicator of the object summary.

10. The system of claim 9 wherein the processor and the memory are further configured to:

request an authoritative object in response to determining that the second one of the first kind objects is to be updated; and use the authoritative object to update the second one of the first kind objects.

11. The system of claim 1, further including an authoritative server, the authoritative server configured to:

store the authoritative objects;

store an object synchronization indicator that indicates none of the objects is synchronized with one of the authoritative objects; and share metadata with a device that includes the memory and the processor, wherein:

the authoritative server is configured to produce the first kind synchronization indicator, the first kind summary, and an object summary;

the metadata includes the first kind synchronization indicator, the first kind summary, and the object summary; and the object summary includes a UID of one of the authoritative objects.

12. The system of claim 1, wherein:

a networking device includes the memory and the processor;

the networking device is configured to process a plurality of network packets in accordance with a plurality of routing rules and a plurality of firewall rules;

the plurality of objects further includes a plurality of second kind objects;

the routing rules are the plurality of first kind objects; and the firewall rules are the plurality of second kind objects.

13. A system comprising:

an authoritative server configured to:

store a plurality of authoritative objects that includes a plurality of authoritative first kind objects;

store an object synchronization indicator that indicates none of a plurality of objects stored by a networking device is synchronized with a first one of the authoritative objects;

produce a first kind synchronization indicator that indicates at least one of the objects is not synchronized with the authoritative first kind objects;

send the first kind synchronization indicator to the networking device in response to a kind synchronization request;

use the authoritative objects to produce a first kind summary that is sent to the networking device in response to receiving a first kind summary request; and send an authoritative object in response to receiving an authoritative object request.

14. The system of claim 13, wherein:

the authoritative objects include a plurality of authoritative second kind objects; and the authoritative server is further configured to:

produce a second kind synchronization indicator that indicates the objects are synchronized with the authoritative second kind objects; and send the second kind synchronization indicator to the networking device in response to the kind synchronization request.

15. The system of claim 13 wherein the authoritative server is further configured to:

receive an object synchronization confirmation that indicates synchronization between one of the authoritative objects and one of the of the objects; and use the object synchronization confirmation to update the first kind synchronization indicator.

16. The system of claim 13 wherein:

the first kind summary includes a plurality of object summaries of the authoritative first kind objects; and the object summaries include an object name, a unique identifier (UID), and a version indicator.

17. The system of claim 13, further comprising:

the networking device, wherein the networking device is configured to:

store the plurality of objects, the objects including a plurality of first kind objects;

request the first kind summary in response to receiving the first kind synchronization indicator, the first kind synchronization indicator indicating that the first kind objects are not synchronized with the authoritative objects;

delete a first one of the objects in response to using the first kind summary to determine that the first one of the objects is to be deleted; and replace a second one of the objects in response to using the first kind summary to determine that the second one of the objects is to be replaced.

18. A method comprising:

storing, by a networking device, a plurality of objects that includes a plurality of first kind objects;

requesting a first kind summary in response to receiving a first kind synchronization indicator that indicates the first kind objects are not synchronized;

deleting a first one of the first kind objects in response to using the first kind summary to determine that the first one of the first kind objects is to be deleted;

replacing a second one of the first kind objects in response to using the first kind summary to determine that the second one of the first kind objects is to be replaced; and determining, in response to receiving another first kind synchronization indicator, that the first kind objects are synchronized.

19. The method of claim 18, wherein:
the first kind objects are a plurality of routing rules; and
the networking device is configured to process a plurality of network packets according to the routing rules.

20. The method of claim 18, further including:
requesting the first kind synchronization indicator and a second kind synchronization indicator by sending a kind synchronization request to an authoritative server storing a plurality of authoritative objects that includes a plurality of authoritative first kind objects and a plurality of authoritative second kind objects;
requesting the first kind summary from the authoritative server;
requesting an authoritative object from the authoritative server in response to determining that one of the first kind objects is to be replaced or updated; and
replacing or updating the one of the first kind objects with the authoritative object.

* * * * *